United States Patent
Nishino

(10) Patent No.: US 11,981,396 B2
(45) Date of Patent: May 14, 2024

(54) BICYCLE OPERATING APPARATUS AND BICYCLE OPERATING SYSTEM

(71) Applicant: SHIMANO INC., Sakai (JP)

(72) Inventor: Takafumi Nishino, Sakai (JP)

(73) Assignee: SHIMANO INC., Sakai (JP)

( * ) Notice: Subject to any disclaimer, the term of this patent is extended or adjusted under 35 U.S.C. 154(b) by 160 days.

(21) Appl. No.: 17/133,476

(22) Filed: Dec. 23, 2020

(65) Prior Publication Data

US 2021/0114689 A1    Apr. 22, 2021

Related U.S. Application Data

(62) Division of application No. 14/555,589, filed on Nov. 27, 2014, now Pat. No. 10,933,949.

(51) Int. Cl.
*B62M 25/08* (2006.01)
*B62M 25/00* (2006.01)

(52) U.S. Cl.
CPC ........ *B62M 25/08* (2013.01); *B62M 2025/003* (2013.01)

(58) Field of Classification Search
CPC ....... B62M 25/04; B62M 25/08; B62K 23/02; B62K 23/06
See application file for complete search history.

(56) References Cited

U.S. PATENT DOCUMENTS

| | | | |
|---|---|---|---|
| 5,470,277 A * | 11/1995 | Romano | B62M 9/132 |
| | | | 474/81 |
| 6,073,730 A | 6/2000 | Abe | |
| 6,129,580 A | 10/2000 | Kishimoto | |
| 6,682,087 B1 | 1/2004 | Takeda | |
| 6,774,771 B2 | 8/2004 | Takeda | |
| 6,779,401 B2 | 8/2004 | Montagnon | |
| 7,159,881 B2 | 1/2007 | Guderzo et al. | |

(Continued)

FOREIGN PATENT DOCUMENTS

| | | |
|---|---|---|
| CN | 102874374 | 1/2013 |
| CN | 103204219 | 7/2013 |

(Continued)

OTHER PUBLICATIONS

Office Action issued by the U.S. Patent and Trademark Office for the U.S. Appl. No. 14/555,589, dated Aug. 25, 2016.

(Continued)

*Primary Examiner* — Bobby Rushing, Jr.
(74) *Attorney, Agent, or Firm* — MORI & WARD, LLP

(57) ABSTRACT

A bicycle operating apparatus includes a base member, an operating member, an electrical switch, a wireless transmitter, and a power supply device. The base member is configured to be attached to a bicycle body. The operating member is movably mounted to the base member configured to be operated by a user. The electrical switch is configured to be activated by an input operation from the user. The wireless transmitter is configured to be electrically connected to the electrical switch and is configured to wirelessly transmit a signal to an additional bicycle component in response to the input operation. The power supply device is configured to supply electrical power to at least one of the electrical switch and the wireless transmitter. The wireless transmitter and the power supply are mounted to the base member.

16 Claims, 13 Drawing Sheets

(56) References Cited

U.S. PATENT DOCUMENTS

| | | | |
|---|---|---|---|
| 7,854,180 | B2 | 12/2010 | Tetsuka |
| 7,900,946 | B2 | 3/2011 | Hara et al. |
| 8,464,844 | B2 | 6/2013 | Jordan |
| 8,646,353 | B2 * | 2/2014 | Uno .................. B62L 3/02 188/24.11 |
| 8,723,659 | B2 | 5/2014 | Tetsuka |
| 8,869,649 | B2 | 10/2014 | Miki et al. |
| 9,120,522 | B1 | 9/2015 | Nishino |
| 9,211,936 | B2 | 12/2015 | Gao |
| 9,233,730 | B2 | 1/2016 | Kariyama et al. |
| 9,676,445 | B2 | 6/2017 | Cracco et al. |
| 2005/0187049 | A1 * | 8/2005 | Guderzo ............ B62M 25/08 474/70 |
| 2008/0155982 | A1 | 7/2008 | Jones et al. |
| 2009/0088934 | A1 | 4/2009 | Takebayashi |
| 2010/0199798 | A1 | 8/2010 | Uno |
| 2011/0320093 | A1 | 12/2011 | Kitamura |
| 2012/0160625 | A1 | 6/2012 | Jordan |
| 2013/0014607 | A1 | 1/2013 | Miki et al. |
| 2013/0061705 | A1 | 3/2013 | Jordan |
| 2013/0090195 | A1 | 4/2013 | Yamaguchi et al. |
| 2013/0180815 | A1 | 7/2013 | Dunlap et al. |
| 2013/0192407 | A1 | 8/2013 | Fujii et al. |
| 2013/0255239 | A1 | 10/2013 | Miki |
| 2014/0053675 | A1 | 2/2014 | Tetsuka |
| 2014/0058578 | A1 | 2/2014 | Tetsuka |
| 2014/0102237 | A1 | 4/2014 | Jordan et al. |
| 2014/0144275 | A1 * | 5/2014 | Kariyama ............ B62K 23/06 74/488 |
| 2014/0174236 | A1 | 6/2014 | Nakamura et al. |
| 2014/0174237 | A1 | 6/2014 | Watarai et al. |
| 2014/0303859 | A1 * | 10/2014 | Miki .................. B62K 23/06 701/60 |
| 2014/0358386 | A1 | 12/2014 | Cracco et al. |
| 2015/0284049 | A1 | 10/2015 | Shipman et al. |
| 2018/0178878 | A1 * | 6/2018 | Komada ............ F15B 21/044 |
| 2019/0300118 | A1 * | 10/2019 | Nishino ............ B62K 23/06 |

FOREIGN PATENT DOCUMENTS

| | | |
|---|---|---|
| CN | 103625593 | 3/2014 |
| CN | 103723238 | 4/2014 |
| DE | 698 19 812 T2 | 9/2004 |
| DE | 11 2008 001 717 B4 | 7/2010 |
| DE | 10 2013 013 342 | 2/2014 |
| JP | 3181557 U | 2/2013 |
| JP | 2014-231330 | 12/2014 |
| TW | 201315638 | 4/2013 |

OTHER PUBLICATIONS

Office Action with Form PTO-892 Notice of References Cited issued by the U.S. Patent and Trademark Office for the U.S. Appl. No. 14/555,589, dated Jan. 31, 2017.

Office Action with Form PTO-892 Notice of References Cited issued by the U.S. Patent and Trademark Office for the U.S. Appl. No. 14/555,589, dated Jul. 26, 2017.

Office Action issued by the U.S. Patent and Trademark Office for the U.S. Appl. No. 14/555,589, dated Nov. 14, 2017.

Office Action with Form PTO-892 Notice of References Cited issued by the U.S. Patent and Trademark Office for the U.S. Appl. No. 14/555,589, dated Dec. 27, 2017.

Office Action with Form PTO-892 Notice of References Cited issued by the U.S. Patent and Trademark Office for the U.S. Appl. No. 14/555,589, dated Jul. 30, 2018.

Office Action with Form PTO-892 Notice of References Cited issued by the U.S. Patent and Trademark Office for the U.S. Appl. No. 14/555,589, dated Feb. 15, 2019.

Office Action issued by the U.S. Patent and Trademark Office for the U.S. Appl. No. 14/555,589, dated May 29, 2019.

Office Action issued by the U.S. Patent and Trademark Office for the U.S. Appl. No. 14/555,589, dated Jun. 25, 2019.

Office Action with Form PTO-892 Notice of References Cited issued by the U.S. Patent and Trademark Office for the U.S. Appl. No. 14/555,589, dated Dec. 16, 2019.

Office Action with Form PTO-892 Notice of References Cited issued by the U.S. Patent and Trademark Office for the U.S. Appl. No. 14/555,589, dated Jun. 15, 2020.

Office Action issued by the U.S. Patent and Trademark Office for the U.S. Appl. No. 14/555,589, dated Sep. 22, 2020.

* cited by examiner

|    |    |      | FS   |      |
|----|----|------|------|------|
|    |    |      | 39   | 53   |
|    |    |      | LOW  | TOP  |
| RS | 28 | 1st  | 1.39 | 1.89 |
|    | 25 | 2nd  | 1.56 | 2.12 |
|    | 23 | 3rd  | 1.70 | 2.30 |
|    | 21 | 4th  | 1.86 | 2.52 |
|    | 19 | 5th  | 2.05 | 2.79 |
|    | 17 | 6th  | 2.29 | 3.12 |
|    | 15 | 7th  | 2.60 | 3.53 |
|    | 14 | 8th  | 2.79 | 3.79 |
|    | 13 | 9th  | 3.00 | 4.08 |
|    | 12 | 10th | 3.25 | 4.42 |
|    | 11 | 11th | 3.55 | 4.82 |

BICYCLE OPERATING APPARATUS AND BICYCLE OPERATING SYSTEM

CROSS-REFERENCE TO RELATED APPLICATION

The present application is a divisional application of U.S. application Ser. No. 14/555,589, filed on Nov. 27, 2014, the entire contents of which are herein incorporated by reference.

BACKGROUND OF THE INVENTION

Field of the Invention

The present invention relates to a bicycle operating apparatus and a bicycle operating system.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating system configured to operate bicycle components. Such bicycle operating systems are configured to mechanically and/or electrically control bicycle components.

SUMMARY OF THE INVENTION

In accordance with a first aspect of the present invention, a bicycle operating apparatus comprises an operating member, a hydraulic unit, an electrical switch, and a wireless transmitter. The operating member is configured to be operated by a user. The hydraulic unit is configured to be operatively coupled to the operating member and is configured to operate a bicycle component in response to an operation of the operating member. The electrical switch is configured to be activated by an input operation from the user. The wireless transmitter is configured to be electrically connected to the electrical switch and is configured to wirelessly transmit a signal to an additional bicycle component in response to the input operation.

In accordance with a second aspect of the present invention, the bicycle operating apparatus according to the first aspect further comprises a base member configured to be attached to a bicycle body. The hydraulic unit is mounted to the base member.

In accordance with a third aspect of the present invention, the bicycle operating apparatus according to the second aspect further comprises an additional operating member configured to receive the input operation. The operating member is movably mounted on the base member. The additional operating member is movable relative to the operating member. The electrical switch is mounted to one of the base member, the operating member and the additional operating member. The wireless transmitter is mounted to one of the base member, the operating member and the additional operating member.

In accordance with a fourth aspect of the present invention, the bicycle operating apparatus according to the third aspect is configured so that the additional operating member is movably mounted on the operating member.

In accordance with a fifth aspect of the present invention, the bicycle operating apparatus according to the fourth aspect is configured so that the operating member is pivotally mounted on the base member about a first pivot axis. The additional operating member is pivotally mounted on the operating member about a second pivot axis which is non-parallel to the first pivot axis.

In accordance with a sixth aspect of the present invention, the bicycle operating apparatus according to the fourth aspect is configured so that the electrical switch is mounted to one of the operating member and the additional operating member. The electrical switch is configured to be activated by the other of the operating member and the additional operating member in response to movement of the additional operating member.

In accordance with a seventh aspect of the present invention, the bicycle operating apparatus according to the sixth aspect is configured so that the electrical switch is mounted to the additional operating member. The electrical switch is configured to be activated by the operating member in response to movement of the additional operating member.

In accordance with an eighth aspect of the present invention, the bicycle operating apparatus according to the third aspect is configured so that the additional operating member is movably mounted to the base member.

In accordance with a ninth aspect of the present invention, the bicycle operating apparatus according to the eighth aspect is configured so that the electrical switch is mounted to one of the operating member and the additional operating member. The electrical switch is configured to be activated by the other of the operating member and the additional operating member in response to movement of the additional operating member.

In accordance with a tenth aspect of the present invention, the bicycle operating apparatus according to the ninth aspect is configured so that the electrical switch is mounted to the additional operating member. The electrical switch is configured to be activated by the operating member in response to movement of the additional operating member.

In accordance with an eleventh aspect of the present invention, the bicycle operating apparatus according to the eighth aspect is configured so that the electrical switch is mounted to the base member. The electrical switch is configured to be activated by the additional operating member in response to movement of the additional operating member.

In accordance with a twelfth aspect of the present invention, the bicycle operating apparatus according to the third aspect further comprises a power supply device configured to supply electrical power to at least one of the electrical switch and the wireless transmitter. The power supply device is mounted to one of the base member, the operating member and the additional operating member.

In accordance with a thirteenth aspect of the present invention, the bicycle operating apparatus according to the twelfth aspect is configured so that the power supply device is mounted to the additional operating member.

In accordance with a fourteenth aspect of the present invention, the bicycle operating apparatus according to the third aspect further comprises an informing device configured to inform the user of a state of the bicycle operating apparatus. The informing device is mounted to one of the base member, the operating member and the additional operating member.

In accordance with a fifteenth aspect of the present invention, the bicycle operating apparatus according to the fourteenth aspect is configured so that the informing device is configured to inform the user of a pairing mode between the bicycle operating apparatus and the additional bicycle component.

In accordance with a sixteenth aspect of the present invention, the bicycle operating apparatus according to the fourteenth aspect is configured so that the informing device is mounted to the additional operating member.

In accordance with a seventeenth aspect of the present invention, the bicycle operating apparatus according to the third aspect further comprises a communication controller configured to control the wireless transmitter to wirelessly transmit the signal to the additional bicycle component in response to the input operation. The communication controller is mounted to one of the base member, the operating member and the additional operating member.

In accordance with an eighteenth aspect of the present invention, the bicycle operating apparatus according to the seventeenth aspect is configured so that the communication controller is mounted to the additional operating member.

In accordance with a nineteenth aspect of the present invention, the bicycle operating apparatus according to the third aspect is configured so that the wireless transmitter is mounted to the additional operating member.

In accordance with a twentieth aspect of the present invention, the bicycle operating apparatus according to the second aspect is configured so that the base member includes a first end portion, a second end portion, and a gripping portion. The first end portion is configured to be attached to the bicycle body. The second end portion is opposite to the first end portion. The gripping portion is configured to be gripped by the user. The gripping portion is provided between the first end portion and the second end portion.

In accordance with a twenty-first aspect of the present invention, the bicycle operating apparatus according to the twentieth aspect is configured so that the operating member is provided at the second end portion.

In accordance with a twenty-second aspect of the present invention, the bicycle operating apparatus according to the second aspect further comprises a power supply device and a housing. The power supply device is configured to supply electrical power to at least one of the electrical switch and the wireless transmitter. At least one of the wireless transmitter and the power supply device is provided in the housing. The housing is separately mounted from the base member to the bicycle body.

In accordance with a twenty-third aspect of the present invention, the bicycle operating apparatus according to the third aspect is configured so that the additional operating member has an internal space in which the electrical switch and the wireless transmitter are arranged.

In accordance with a twenty-fourth aspect of the present invention, the bicycle operating apparatus according to the third aspect is configured so that the additional operating member comprises a resin material.

In accordance with a twenty-fifth aspect of the present invention, the bicycle operating apparatus according to the first aspect is configured so that the wireless transmitter is configured to wirelessly transmit a directional signal to the additional bicycle component in response to the input operation.

In accordance with a twenty-sixth aspect of the present invention, the bicycle operating apparatus according to the first aspect is configured so that the additional operating member includes an internal space which extends in a rearward direction of a bicycle body in a state where the bicycle operating apparatus is mounted to the bicycle body. The wireless transmitter is provided in the internal space.

In accordance with a twenty-seventh aspect of the present invention, a bicycle operating system comprises a bicycle operating apparatus and a transmission controller. The bicycle operating apparatus includes a first electrical switch, a second electrical switch, and a hydraulic operating unit. The first electrical switch is configured to receive a first input operation from a user to generate a first control signal in response to the first input operation. The second electrical switch is configured to receive a second input operation from the user to generate a second control signal in response to the second input operation. The hydraulic operating unit is configured to operate a bicycle component. The transmission controller is configured to control a first transmission to upshift in response to the first control signal. The transmission controller is configured to control the first transmission to downshift in response to the second control signal. The transmission controller is configured to control a second transmission to upshift or downshift in response to combination of the first control signal and the second control signal.

In accordance with a twenty-eighth aspect of the present invention, the bicycle operating apparatus according to the twenty-seventh aspect is configured so that the hydraulic operating unit includes a first hydraulic unit and a second hydraulic unit. The first hydraulic unit is configured to operate a first bicycle component. The second hydraulic unit is configured to operate a second bicycle component. The bicycle operating apparatus includes a first operating device and a second operating device. The first operating device includes the first electrical switch and the first hydraulic unit. The second operating device includes the second electrical switch and the second hydraulic unit. The second operating device is separately provided from the first operating device.

In accordance with a twenty-ninth aspect of the present invention, a bicycle operating system comprises a bicycle operating apparatus and a transmission controller. The bicycle operating apparatus includes a first electrical switch, a second electrical switch, and a hydraulic operating unit. The first electrical switch is configured to receive a first input operation from a user to generate a first control signal in response to the first input operation. The second electrical switch is configured to receive a second input operation from the user to generate a second control signal in response to the second input operation. The hydraulic operating unit is configured to operate a bicycle component. The transmission controller is configured to control at least one transmission in accordance with a transmission route in response to at least one of the first control signal and the second control signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 13 shows a shift table for the bicycle operating system illustrated in FIG. 12.

DESCRIPTION OF THE EMBODIMENTS

Figure 1:
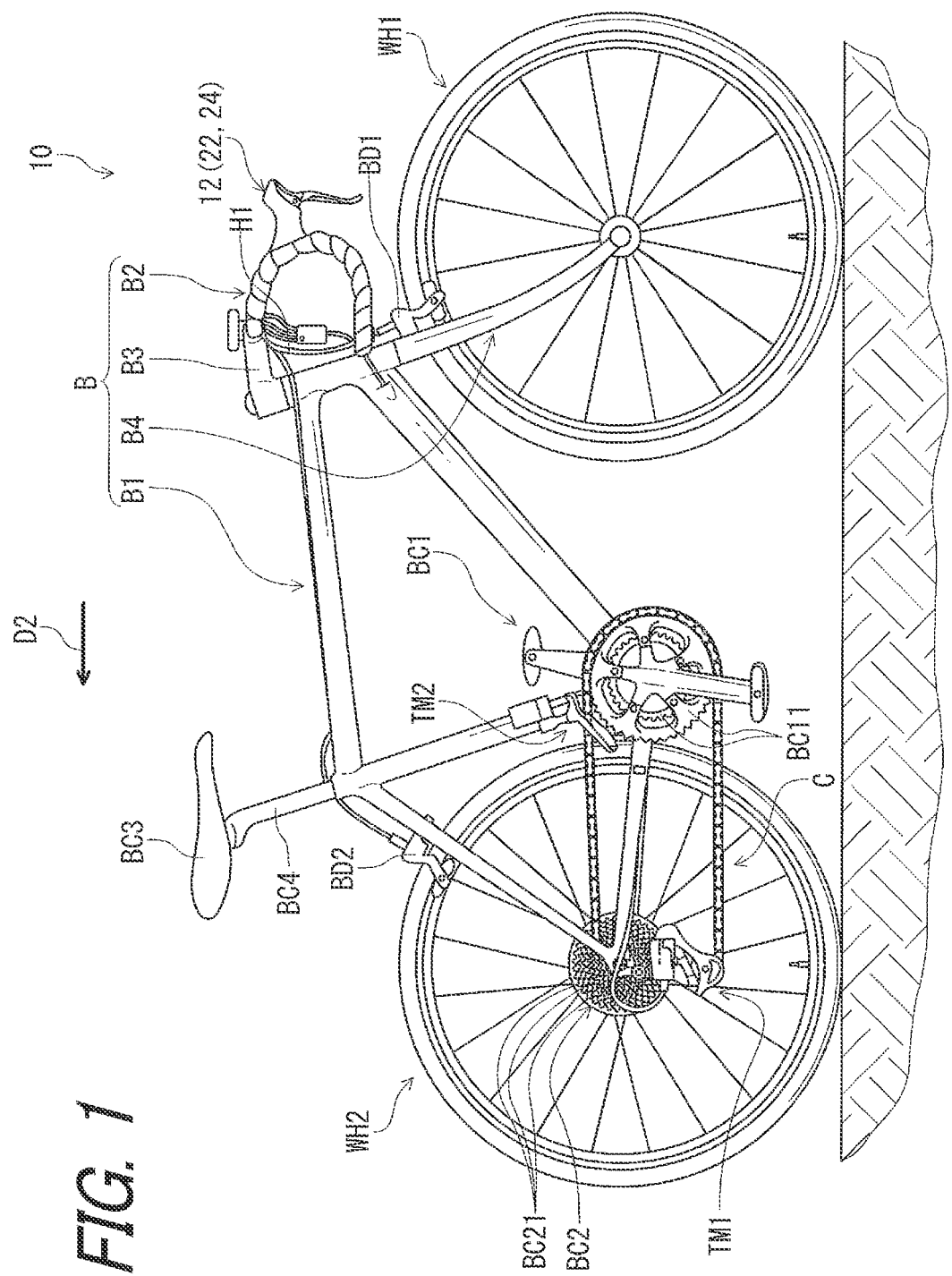
FIG. 1 is a side elevational view of a bicycle equipped with a bicycle operating system in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 is illustrated that is equipped with a bicycle operating system 12 in accordance with a first embodiment. While the bicycle 10 is illustrated as a road bike, the bicycle operating system 12 can be applied to mountain bikes or any type of bicycle.

As seen in FIG. 1, the bicycle 10 includes a bicycle body B, a crank assembly BC1, a rear sprocket assembly BC2, a saddle BC3, a seatpost BC4, and a bicycle chain C. The bicycle body B includes a bicycle frame B1, a handlebar B2, a stem B3, and a front fork B4. The handlebar B2 is coupled to the front fork B4 via the stem B3. The crank assembly BC1 includes a plurality of chain wheels BC11 arranged in a transverse direction of the bicycle body B. The rear sprocket assembly BC2 includes a plurality of sprockets BC21 arranged in the transverse direction. In the illustrated embodiment, the crank assembly BC1 includes two of the chain wheels BC11, and the rear sprocket assembly BC2 includes eleven of the sprockets BC21. The bicycle chain C engages with one of the chain wheels BC11 and one of the sprockets BC21. The saddle BC3 is attached to the bicycle body B via the seatpost BC4.

The bicycle 10 includes a first transmission TM1 and a second transmission TM2. The first transmission TM1 is configured to shift the bicycle chain C between the sprockets BC21. The second transmission TM2 is configured to shift the bicycle chain C between the chain wheels BC11. While the first transmission TM1 is a rear derailleur and the second transmission TM2 is a front derailleur in the illustrated embodiment, any type of bicycle transmission can be applied to the first transmission TM1 and the second transmission TM2.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle BC3 of the bicycle 10 with facing the handlebar B2. Accordingly, these terms, as utilized to describe bicycle components, should be interpreted relative to the bicycle 10 equipped with the bicycle components as used in an upright riding position on a horizontal surface.

Figure 2:
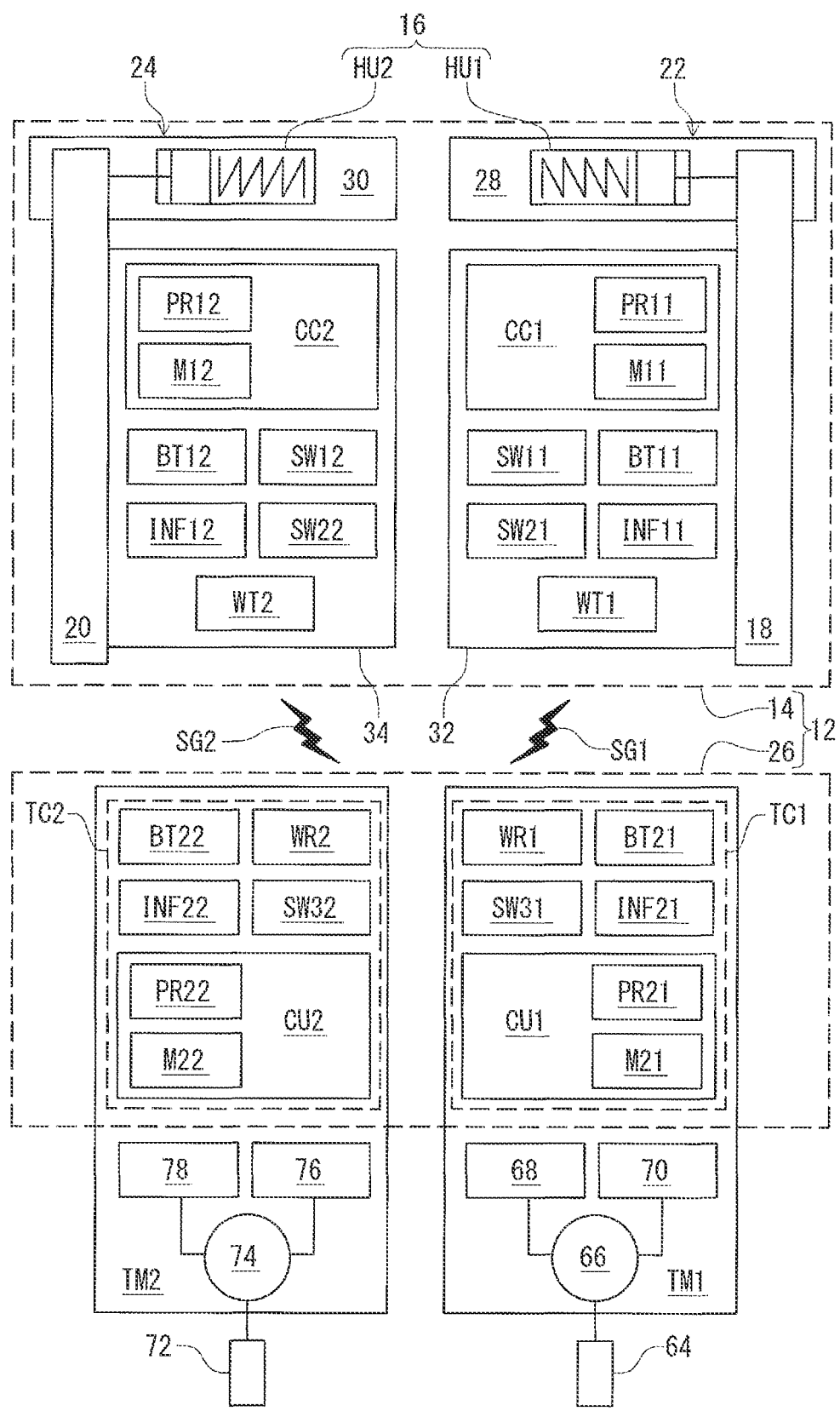
FIG. 2 is a block diagram of the bicycle operating system in accordance with the first embodiment.

As seen in FIG. 2, the bicycle operating system 12 comprises a bicycle operating apparatus 14. The bicycle operating apparatus 14 includes a hydraulic operating unit 16 configured to operate a bicycle component. The hydraulic operating unit 16 includes a first hydraulic unit HU1 and a second hydraulic unit HU2. The first hydraulic unit HU1 is configured to operate a first bicycle component. The second hydraulic unit HU2 is configured to operate a second bicycle component.

In the illustrated embodiment, the first hydraulic unit HU1 is configured to operate a first brake device BD1 (FIG. 1) configured to apply a braking force to a front wheel WH1 (FIG. 1). The second hydraulic unit HU2 is configured to operate a second brake device BD2 (FIG. 1) configured to apply a braking force to a rear wheel WH2 (FIG. 1). One of the first hydraulic unit HU1 and the second hydraulic unit HU2 can be omitted from the hydraulic operating unit 16 if needed and/or desired.

The first hydraulic unit HU1 can be also referred to as a hydraulic unit HU1. The second hydraulic unit HU2 can be also referred to as a hydraulic unit HU2. Namely, the bicycle operating apparatus 14 comprises the hydraulic unit HU1 and the hydraulic unit HU2.

As seen in FIG. 2, the bicycle operating apparatus 14 comprises an operating member configured to be operated by a user. In the illustrated embodiment, the bicycle operating apparatus 14 comprises a first operating member 18 and a second operating member 20 which are configured to be operated by the user. The first operating member 18 can be also referred to as an operating member 18. The second operating member 20 can be also referred to as an operating member 20.

While the operating members 18 and 20 are separate members in the illustrated embodiment, the operating members 18 and 20 can be integrally provided with each other if needed and/or desired. Furthermore, one of the operating members 18 and 20 can be omitted from the bicycle operating apparatus 14 if needed and/or desired.

The hydraulic unit HU1 is configured to be operatively coupled to the operating member 18. The hydraulic unit HU1 is configured to operate a bicycle component in response to an operation of the operating member 18. The hydraulic unit HU2 is configured to be operatively coupled to the operating member 20. The hydraulic unit HU2 is configured to operate a bicycle component in response to an operation of the operating member 20.

In the illustrated embodiment, the hydraulic unit HU1 is configured to operate the first brake device BD1 (FIG. 1) in response to the operation of the operating member 18. The hydraulic unit HU2 is configured to operate the second brake device BD2 (FIG. 1) in response to the operation of the operating member 20. The bicycle component is not limited to the brake device. At least one of the hydraulic units HU1 and HU2 can be configured to operate devices other than the brake device.

As seen in FIG. 2, the bicycle operating apparatus 14 comprises at least one electrical switch configured to be activated by an input operation from the user. In the illustrated embodiment, the bicycle operating apparatus 14 includes a first electrical switch SW11 and a second electrical switch SW12. The first electrical switch SW11 is configured to receive a first input operation from the user to generate a first control signal SG1 in response to the first input operation. The second electrical switch SW12 is configured to receive a second input operation from the user to generate a second control signal SG2 in response to the second input operation.

The first electrical switch SW11 can be also referred to as an electrical switch SW11. The second electrical switch SW12 can be also referred to as an electrical switch SW12. The electrical switch SW11 is configured to be activated by the input operation from the user. The electrical switch SW12 is configured to be activated by the input operation from the user.

The bicycle operating apparatus 14 includes a first operating device 22 and a second operating device 24. The first operating device 22 include the first electrical switch SW11 and the first hydraulic unit HU1. The second operating device 24 includes the second electrical switch SW12 and the second hydraulic unit HU2. In the illustrated embodiment, the first operating device 22 includes the first operating member 18. The second operating device 24 includes the second operating member 20. While the second operating device 24 is separately provided from the first operating device 22 in the illustrated embodiment, the first operating device 22 and the second operating device 24 can be integrally provided with each other if needed and/or desired.

As seen in FIG. 2, the bicycle operating apparatus 14 comprises at least one wireless transmitter. In the illustrated embodiment, the bicycle operating apparatus 14 comprises a first wireless transmitter WT1 and a second wireless transmitter WT2. The first wireless transmitter WT1 can be also referred to as a wireless transmitter WT1. The second wireless transmitter WT2 can be also referred to as a wireless transmitter WT2. While the wireless transmitters WT1 and WT2 are separate devices in the illustrated embodiment, the wireless transmitters WT1 and WT2 can be integrally provided with each other if needed and/or desired. Furthermore, one of the wireless transmitters WT1 and WT2 can be omitted from the bicycle operating apparatus 14 if needed and/or desired.

The wireless transmitter WT1 is configured to be electrically connected to the electrical switch SW11. The wireless transmitter WT1 is configured to wirelessly transmit a signal to an additional bicycle component in response to the input operation from the user toward the electrical switch SW11. Similarly, the wireless transmitter WT2 is configured to be electrically connected to the electrical switch SW12. The wireless transmitter WT2 is configured to wirelessly transmit a signal to an additional bicycle component in response to the input operation from the user toward the electrical switch SW12.

The bicycle operating system 12 comprises a transmission controller 26. In the illustrated embodiment, the wireless transmitter WT1 is configured to wirelessly transmit a signal (e.g., the first control signal SG1) to the transmission controller 26 in response to the input operation. The wireless transmitter WT2 is configured to wirelessly transmit a signal (e.g., the second control signal SG2) to the transmission controller 26 in response to the input operation.

The wireless transmitter WT1 is configured to wirelessly transmit a directional signal to the additional bicycle component in response to the input operation. The wireless transmitter WT2 is configured to wirelessly transmit a directional wireless signal to the additional bicycle component in response to the input operation. In the illustrated embodiment, the wireless transmitter WT1 is configured to wirelessly transmit the directional wireless signal to the transmission controller 26 in response to the input operation. The wireless transmitter WT2 is configured to wirelessly transmit the directional wireless signal to the transmission controller 26 in response to the input operation.

For example, each of the wireless transmitters WT1 and WT2 includes a directional wireless antenna (not shown) to more strongly output a wireless signal in a specific direction than other directions. However, at least one of the wireless transmitters WT1 and WT2 can be configured to wirelessly transmit a signal which does not have directional characteristics if needed and/or desired.

As seen in FIG. 2, the bicycle operating apparatus 14 further comprises at least one informing device. In the illustrated embodiment, the bicycle operating apparatus 14 further comprises a first informing device INF11 and a second informing device INF12. The first informing device INF11 can be also referred to as an informing device INF11. The second informing device INF12 can be also referred to as an informing device INF12. While the informing devices INF11 and INF12 are separate devices in the illustrated embodiment, the informing devices INF11 and INF12 can be integrally provided with each other if needed and/or desired. Furthermore, one of the informing devices INF11 and INF12 can be omitted from the bicycle operating apparatus 14 if needed and/or desired.

The informing device INF11 is configured to inform the user of a state of the bicycle operating apparatus 14. The informing device INF11 is configured to inform the user of a pairing mode between the bicycle operating apparatus 14 and the additional bicycle component. More specifically, the informing device INF11 is configured to inform the user of the pairing mode between the bicycle operating apparatus 14 (the first operating device 22) and the transmission controller 26. In the illustrated embodiment, the informing device INF11 includes a light emitting diode (LED) configured to emit light in accordance with the state of the bicycle operating apparatus 14 (the first operating device 22) and the pairing mode.

Similarly, the informing device INF12 is configured to inform the user of a state of the bicycle operating apparatus 14. The informing device INF12 is configured to inform the user of a pairing mode between the bicycle operating apparatus 14 and the additional bicycle component. More specifically, the informing device INF12 is configured to inform the user of the pairing mode between the bicycle operating apparatus 14 (the second operating device 24) and the transmission controller 26. In the illustrated embodiment, the informing device INF12 includes a light emitting diode (LED) configured to emit light in accordance with the state of the bicycle operating apparatus 14 (the second operating device 24) and the pairing mode.

As seen in FIG. 2, the bicycle operating apparatus 14 further comprises at least one communication controller. In the illustrated embodiment, the bicycle operating apparatus 14 further comprises a first communication controller CC1 and a second communication controller CC2. The first communication controller CC1 can be also referred to as a communication controller CC1. The second communication controller CC2 can be also referred to as a communication controller CC2. While the communication controllers CC1 and CC2 are separate devices in the illustrated embodiment, the communication controllers CC1 and CC2 can be integrally provided with each other if needed and/or desired. Furthermore, one of the communication controllers CC1 and CC2 can be omitted from the bicycle operating apparatus 14 if needed and/or desired.

The communication controller CC1 is configured to control the wireless transmitter WT1 to wirelessly transmit the signal to the additional bicycle component in response to the input operation. The communication controller CC2 is configured to control the wireless transmitter WT2 to wirelessly transmit the signal to the additional bicycle component in response to the input operation.

For example, the communication controller CC1 is electrically connected to each of the electrical switch SW11, the wireless transmitter WT1, and the informing device INF11. The electrical switch SW11 is electrically connected to the wireless transmitter WT1 via the communication controller CC1. The communication controller CC2 is electrically connected to each of the electrical switch SW12, the wireless transmitter WT2, and the informing device INF12. The electrical switch SW12 is electrically connected to the wireless transmitter WT2 via the communication controller CC2.

In the illustrated embodiment, the communication controller CC1 controls the wireless transmitter WT1 to wirelessly transmit the signal to the additional bicycle component when the electrical switch SW11 is activated in response to the input operation from the user. The communication controller CC2 controls the wireless transmitter WT2 to wirelessly transmit the signal to the additional bicycle component when the electrical switch SW12 is activated in response to the input operation from the user. The communication controller CC1 is configured to detect the activation of the electrical switch SW11. The communication controller CC2 is configured to detect the activation of the electrical switch SW12.

The communication controller CC1 is configured to generate the first control signal SG1 in response to the activation of the electrical switch SW11. The wireless transmitter WT1 is configured to superimpose the first control signal SG1 on carrier wave using a predetermined wireless communication protocol to generate wireless signals.

Similarly, the communication controller CC2 is configured to generate the second control signal SG2 in response to the activation of the electrical switch SW12. The wireless transmitter WT2 is configured to superimpose the second control signal SG2 on carrier wave using a predetermined wireless communication protocol to generate wireless signals.

As seen in FIG. 2, the communication controller CC1 is constituted as a microcomputer and includes a processor PR11 and a memory M11. The processor PR11 includes a central processing unit (CPU). The memory M11 includes a read only memory (ROM) and a random access memory (RAM). For example, a program stored in the memory M11 is read into the processor PR11, and thereby functions of the communication controller CC1 are performed.

Similarly, the communication controller CC2 is constituted as a microcomputer and includes a processor PR12 and a memory M12. The processor PR12 includes a central processing unit (CPU). The memory M12 includes a read only memory (ROM) and a random access memory (RAM). For example, a program stored in the memory M12 is read into the processor PR12, and thereby functions of the communication controller CC2 are performed.

While each of the communication controllers CC1 and CC2 is illustrated as a single unit in FIG. 2, at least one of the communication controllers CC1 and CC2 can be part of another component or can be part of several components (e.g., multiple controllers located in different parts). Furthermore, the communication controllers CC1 and CC2 can be integrally provided with each other.

As seen in FIG. 2, the bicycle operating apparatus 14 further comprises a function switch. In the illustrated embodiment, the first operating device 22 includes a first function switch SW21. The second operating device 24 includes a second function switch SW22. The first function switch SW21 is electrically connected to the communication controller CC1. The second function switch SW22 is electrically connected to the communication controller CC2. The communication controller CC1 is configured to enter a setting mode for an initial setting and/or programming when the first function switch SW21 is operated by the user. The communication controller CC2 is configured to enter a setting mode for an initial setting and/or programming when the second function switch SW22 is operated by the user. At least one of the first function switch SW21 and the second function switch SW22 can be omitted from the bicycle operating apparatus 14 if needed and/or desired.

As seen in FIG. 2, the bicycle operating apparatus 14 further comprises at least one power supply device. In the illustrated embodiment, the bicycle operating apparatus 14 further comprises a first power supply device BT11 and a second power supply device BT12. The first power supply device BT11 can be also referred to as a power supply device BT11. The second power supply device BT12 can be also referred to as a power supply device BT12. While the power supply devices BT11 and BT12 are separate devices in the illustrated embodiment, the power supply devices BT11 and BT12 can be integrally provided with each other if needed and/or desired. Furthermore, one of the power supply devices BT11 and BT12 can be omitted from the bicycle operating apparatus 14 if needed and/or desired.

The power supply device BT11 is configured to supply electrical power to at least one of the electrical switch SW11 and the wireless transmitter WT1. The power supply device BT12 is configured to supply electrical power to at least one of the electrical switch SW12 and the wireless transmitter WT2. In the illustrated embodiment, the power supply device BT11 is configured to supply electrical power to the electrical switch SW11 and the wireless transmitter WT1. The power supply device BT12 is configured to supply electrical power to the electrical switch SW12 and the wireless transmitter WT2. Each of the power supply devices BT11 and BT12 is a battery, for example.

In the illustrated embodiment, the power supply device BT11 is configured to supply electrical power to the electrical switch SW11, the wireless transmitter WT1, the communication controller CC1, the informing device INF11, and the function switch SW21. The power supply device BT12 is configured to supply electrical power to the electrical switch SW12, the wireless transmitter WT2, the communication controller CC2, the informing device INF12, and the function switch SW22.

As seen in FIG. 2, the bicycle operating apparatus 14 further comprises at least one base member configured to be attached to the bicycle body B (FIG. 1). In the illustrated embodiment, the bicycle operating apparatus 14 further comprises a first base member 28 and a second base member 30. The first base member 28 can be also referred to as a base member 28. The second base member 30 can be also referred to as a base member 30. While the base members 28 and 30 are separate members in the illustrated embodiment, the base members 28 and 30 can be integrally provided with each other if needed and/or desired. Furthermore, at least one of the base members 28 and 30 can be omitted from the bicycle operating apparatus 14 if needed and/or desired.

The base member 28 is configured to be attached to the bicycle body B (FIG. 1). The base member 30 is configured to be attached to the bicycle body B (FIG. 1). The hydraulic unit HU1 is mounted to the base member 28. The hydraulic unit HU2 is mounted to the base member 30. While each of the base members 28 and 30 is attached to the handlebar B2 (FIG. 1) in the illustrated embodiment, at least one of the base members 28 and 30 can be attached to other part of the bicycle body B if needed and/or desired.

As seen in FIG. 2, the bicycle operating apparatus 14 further comprises at least one additional operating member. In the illustrated embodiment, the bicycle operating apparatus 14 further comprises a first additional operating member 32 and a second additional operating member 34. The first additional operating member 32 can be also referred to as an additional operating member 32. The second additional operating member 34 can be also referred to as an additional operating member 34. The additional operating member 32 is configured to receive the input operation. The additional operating member 34 is configured to receive the input operation. The first additional operating member 32 is configured to be operated by the user. The second additional operating member 34 is configured to be operated by the user.

While the additional operating members 32 and 34 are separate members in the illustrated embodiment, the additional operating members 32 and 34 can be integrally provided with each other if needed and/or desired. Furthermore, at least one of the additional operating members 32 and 34 can be omitted from the bicycle operating apparatus 14 if needed and/or desired.

Figure 3:
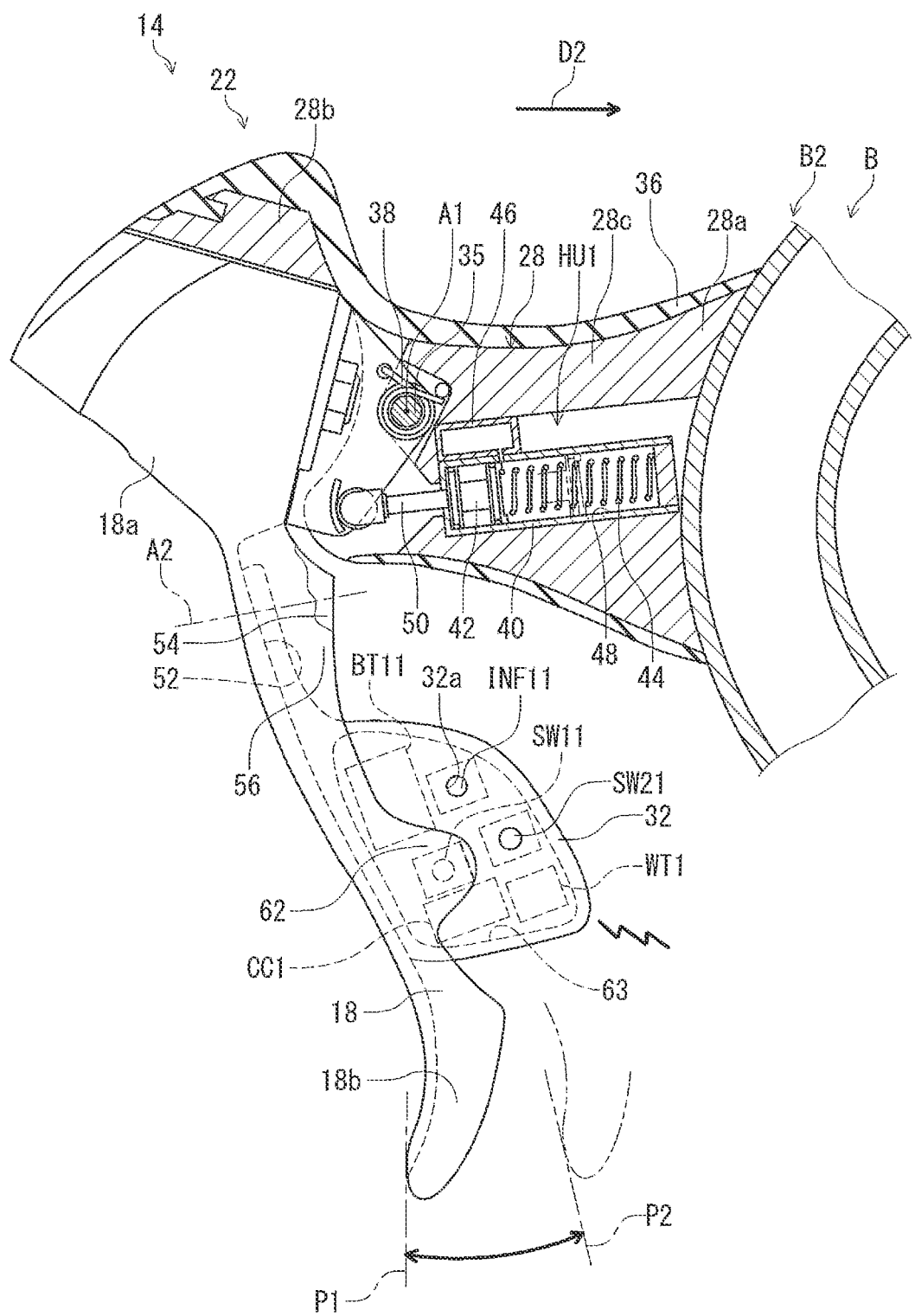
FIG. 3 is a cross-sectional view of an operating device of the bicycle operating system illustrated in FIG. 2.

As seen in FIG. 3, the operating member 18 is movably mounted on the base member 28. The operating member 18 is pivotally mounted on the base member 28 about a first pivot axis A1. In the first operating device 22, the operating member 18 is pivotally mounted on the base member 28 via a pivot shaft 35 attached to the base member 28. The additional operating member 32 is movable relative to the operating member 18. In the illustrated embodiment, the additional operating member 32 is movably mounted on the operating member 18. The additional operating member 32 is pivotally mounted on the operating member 18 about a second pivot axis A2 which is non-parallel to the first pivot axis A1.

The base member 28 include a first end portion 28a, a second end portion 28b, and a gripping portion 28c. The first end portion 28a is configured to be attached to the bicycle body B. The second end portion 28b is opposite to the first end portion 28a. The gripping portion 28c is configured to be gripped by the user. The gripping portion 28c is provided between the first end portion 28a and the second end portion 28b. The operating member 18 is provided at the second end portion 28b.

The first operating device 22 includes a cover 36 and a biasing element 38. The cover 36 is configured to at least partially cover the base member 28. For example, the cover 36 is made of a non-metallic material such as rubber, and the base member 28 is made of a metallic material. The base member 28 can be made of a non-metallic material if needed and/or desired. The cover 36 can be omitted from the first operating device 22 if needed and/or desired. The biasing element 38 is configured to bias the operating member 18 toward a rest position P1.

The hydraulic unit HU1 includes a hydraulic cylinder 40, a piston 42, a piston biasing member 44, and a reservoir 46. The hydraulic cylinder 40 is provided in the base member 28. The piston 42 is movably disposed in the hydraulic cylinder 40. The hydraulic cylinder 40 includes a cylinder bore 48 in which the piston 42 is movably disposed. The piston biasing member 44 is provided in the cylinder bore 48 to bias the piston 42. The piston 42 is operatively coupled to the operating member 18 via a connecting rod 50. The piston biasing member 44 is configured to bias the operating member 18 via the piston 42 and the connecting rod 50 toward the rest position P1.

The reservoir 46 is configured to be in fluid communication with the cylinder bore 48. The hydraulic cylinder 40 is configured to be in fluid communication with the first brake device BD1 (FIG. 1) via a hydraulic hose H1 (FIG. 1). When the operating member 18 is pivoted relative to the base member 28 about the first pivot axis A1 toward an operated position P2, the hydraulic pressure is applied to the first brake device BD1 via the hydraulic hose H1 to actuate the first brake device BD1.

In the present application, the term "rest position" as used herein refers to a position at which a movable part such as the operating member 18 remains stationary in a state where the movable part is not operated by the user. The term "operated position" as used herein refers to a position at which the movable part has been operated by the user to perform the operation of the bicycle component.

As seen in FIG. 3, the electrical switch SW11 is mounted to one of the base member 28, the operating member 18 and the additional operating member 32. The electrical switch SW11 is mounted to one of the operating member 18 and the additional operating member 32. The electrical switch SW11 is configured to be activated by the other of the operating member 18 and the additional operating member 32 in response to movement of the additional operating member 32. In the illustrated embodiment, the electrical switch SW11 is mounted to the additional operating member 32. The electrical switch SW11 is configured to be activated by the operating member 18 in response to movement of the additional operating member 32. The electrical switch SW11 can be mounted to the operating member 18 if needed and/or desired. In such an embodiment, the electrical switch SW11 is configured to be activated by the additional operating member 32 in response to movement of the additional operating member 32.

Figure 4:
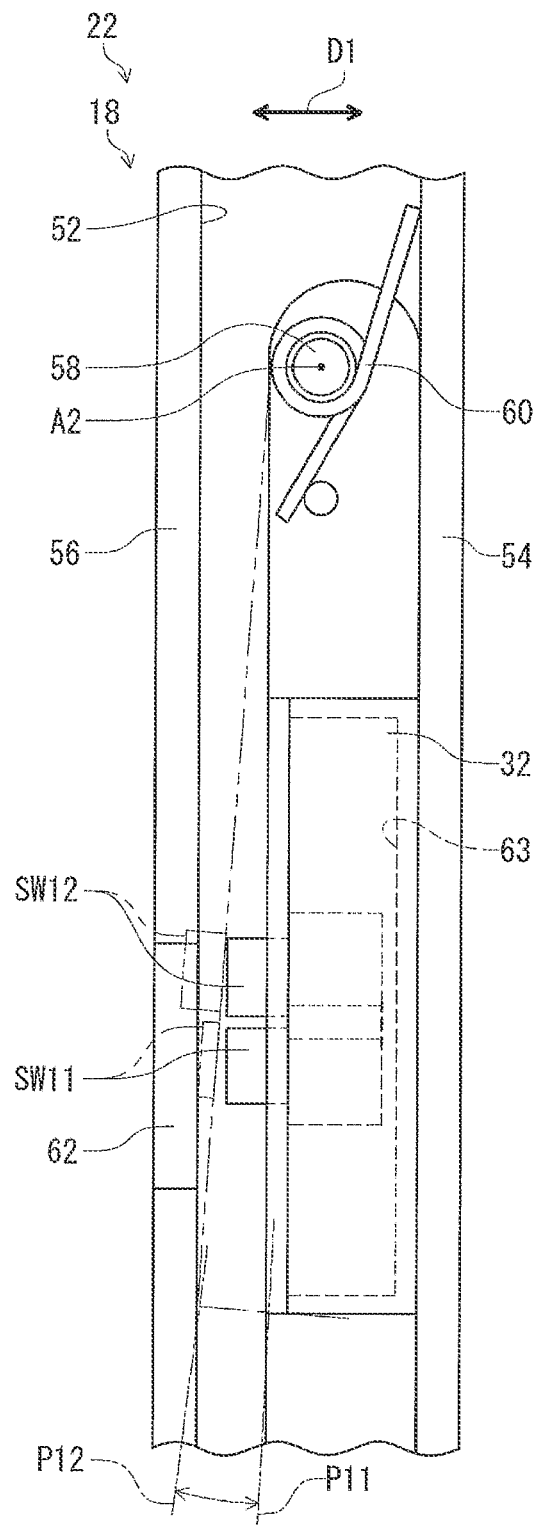
FIG. 4 is a partial rear elevational view of the operating device illustrated in FIG. 3.

As seen in FIG. 4, the operating member 18 includes a cavity 52 in which the additional operating member 32 is at least partially provided. As seen in FIG. 3, the operating member 18 includes a first end part 18a and a second end part 18b opposite to the first end part 18a. The first end part 18a is pivotally coupled to the base member 28. The cavity 52 extends between the first end part 18a and the second end part 18b. The additional operating member 32 is disposed between the first end part 18a and the second end part 18b.

As seen in FIG. 4, the operating member 18 includes a first side wall 54 and a second side wall 56 which are spaced apart from each other. The first side wall 54 and the second side wall 56 extends between the first end part 18a and the second end part 18b. The cavity 52 is defined between the first side wall 54 and the second side wall 56. The additional operating member 32 is at least partially provided between the first side wall 54 and the second side wall 56.

The first operating device 22 includes a pivot pin 58 and a biasing member 60. The pivot pin 58 is secured to the operating member 18. The additional operating member 32 is pivotally mounted to the operating member 18 via the pivot pin 58. The biasing member 60 is configured to bias the additional operating member 32 toward the first side wall 54. The first side wall 54 is configured to position the additional operating member 32 at a rest position P11.

As seen in FIGS. 3 and 4, the operating member 18 includes a receiving portion 62 provided on the second side wall 56. The receiving portion 62 extends from the second side wall 56. As seen in FIG. 3, the electrical switch SW11 overlaps with the receiving portion 62 when viewed from an axial direction D1 (FIG. 4) parallel to the first pivot axis A1. As seen in FIG. 4, the electrical switch SW11 is disposed to face the receiving portion 62 in the axial direction D1.

As seen in FIG. 4, when the additional operating member 32 is pushed toward the second side wall 56 by the user, the additional operating member 32 pivots relative to the operating member 18 about the second pivot axis A2 toward an operated position P12. This causes the electrical switch SW11 to be activated by the receiving portion 62 of the operating member 18 in response to pivotal movement of the additional operating member 32 relative to the operating member 18.

As seen in FIG. 3, the wireless transmitter WT1 is mounted to one of the base member 28, the operating member 18 and the additional operating member 32. In the illustrated embodiment, the wireless transmitter WT1 is mounted to the additional operating member 32. The wireless transmitter WT1 can be also mounted to one of the base member 28 and the operating member 18 if needed and/or desired.

The power supply device BT11 is mounted to one of the base member 28, the operating member 18 and the additional operating member 32. In the illustrated embodiment, the power supply device BT11 is mounted to the additional operating member 32. The power supply device BT11 can be also mounted to one of the base member 28 and the operating member 18 if needed and/or desired.

The informing device INF11 is mounted to one of the base member 28, the operating member 18 and the additional operating member 32. In the illustrated embodiment, the informing device INF11 is mounted to the additional operating member 32. The informing device INF11 can be also mounted to one of the base member 28 and the operating member 18 if needed and/or desired.

The communication controller CC1 is mounted to one of the base member 28, the operating member 18 and the additional operating member 32. In the illustrated embodiment, the communication controller CC1 is mounted to the additional operating member 32. The communication controller CC1 can be also mounted to one of the base member 28 and the operating member 18 if needed and/or desired.

As seen in FIG. 3, the additional operating member 32 has an internal space 63 in which the electrical switch SW11 and the wireless transmitter WT1 are arranged. For example, the additional operating member 32 comprises a resin material. The additional operating member 32 can selectively include carbon fiber and other reinforcement materials in addition to the resin material. In other words, the additional operating member 32 can be made of a carbon fiber reinforced plastic and so on. However, the additional operating member 32 can be made of other materials if needed and/or desired. The additional operating member 32 includes, for example, a case and a lid detachably attached to the case. The internal space 63 is defined by the case and the lid. As seen in FIG. 4, a button of the electrical switch SW11 protrudes from the additional operating member 32. A button of the first function switch SW21 protrudes from the additional operating member 32.

As seen in FIG. 3, the internal space 63 extends in a rearward direction D2 of the bicycle body B in a state where the bicycle operating apparatus 14 is mounted to the bicycle body B. The wireless transmitter WT1 is provided in the internal space 63. The power supply device BT11 and the informing device INF11 are provided in the internal space 63. The informing device INF11 is exposed from a through-hole 32a provided on the additional operating member 32.

The communication controller CC1, the electrical switch SW11, then function switch SW21, the wireless transmitter WT1 and the informing device INF11 are provided on a substrate (not shown) secured to the additional operating member 32 in the internal space 63, for example.

Since the second operating device 24 (FIG. 2) has substantially the same constructions as those of the first operating device 22, except that they are mirror images of each other, they will not be described and/or illustrated in detail here for the sake of brevity.

As seen in FIG. 2, the transmission controller 26 is configured to control the first transmission TM1 to upshift in response to the first control signal SG1. The transmission controller 26 is configured to control the first transmission TM1 to downshift in response to the second control signal SG2. The transmission controller 26 is configured to control the second transmission TM2 to upshift or downshift in response to combination of the first control signal SG1 and the second control signal SG2.

In the illustrated embodiment, the transmission controller 26 includes a first transmission controller TC1 and a second transmission controller TC2. The first transmission controller TC1 is configured to control the first transmission TM1. The second transmission controller TC2 is configured to control the second transmission TM2. In the illustrated embodiment, the first transmission controller TC1 is provided in the first transmission TM1. The second transmission controller TC2 is provided in the second transmission TM2. While the first transmission controller TC1 and the second transmission controller TC2 are separate devices in the illustrated embodiment, the first transmission controller TC1 and the second transmission controller TC2 can be integrally provided with each other if needed and/or desired. Furthermore, one of the first transmission controller TC1 and the second transmission controller TC2 can be omitted from the transmission controller 26 if needed and/or desired.

More specifically, the first transmission controller TC1 is configured to control the first transmission TM1 to upshift in response to the first control signal SG1. The first transmission controller TC1 is configured to control the first transmission TM1 to downshift in response to the second control signal SG2. The second transmission controller TC2 is configured to control the second transmission TM2 to upshift or downshift in response to combination of the first control signal SG1 and the second control signal SG2.

In the present application, the term "upshift" refers to changing into a higher gear ratio in the bicycle operating system 12. The term "downshift" refers to changing into a lower gear ratio in the bicycle operating system 12. In the rear sprocket assembly BC2, for example, upshifting occurs when the bicycle chain C (FIG. 1) is shifted by the first transmission TM1 from a larger sprocket BC21 to a smaller sprocket BC21. The larger sprocket BC21 has a total number of teeth larger than a total number of teeth of the smaller sprocket BC21. The opposite action is applied to downshifting in the rear sprocket assembly BC2. In the crank assembly BC1, upshifting occurs when the bicycle chain C (FIG. 1) is shifted by the second transmission TM2 from a smaller chain wheel BC11 to a larger chain wheel BC11. The larger chain wheel BC11 has a total number of teeth larger than a total number of teeth of the smaller chain wheel BC11. The opposite action is applied to downshifting in the crank assembly BC1.

The first transmission controller TC1 includes a first control unit CU1 constituted as a microcomputer. The first control unit CU1 includes a processor PR21 and a memory M21. The processor PR21 includes a central processing unit (CPU). The memory M21 includes a read only memory (ROM) and a random access memory (RAM). For example, a program stored in the memory M21 is read into the processor PR21, and thereby functions of the first transmission controller TC1 are performed.

The second transmission controller TC2 includes a second control unit CU2 constituted as a microcomputer. The second control unit CU2 includes a processor PR22 and a memory M22. The processor PR22 includes a central processing unit (CPU). The memory M22 includes a read only memory (ROM) and a random access memory (RAM). For example, a program stored in the memory M22 is read into the processor PR22, and thereby functions of the second transmission controller TC2 are performed.

While each of the first and second transmission controllers TC1 and TC2 is illustrated as a single unit in FIG. 2, at least one of the first and second transmission controllers TC1 and TC2 can be part of another component or can be part of several components (e.g., multiple controllers located in different parts). Furthermore, the first and second transmission controllers TC1 and TC2 can be integrally provided with each other.

The transmission controller 26 has a pairing mode in which the transmission controller 26 establishes a wireless communication with the bicycle operating apparatus 14. More specifically, the first transmission controller TC1 has a pairing mode in which the first transmission controller TC1 establishes a wireless communication with each of the first operating device 22 and the second operating device 24. The second transmission controller TC2 has a pairing mode in which the second transmission controller TC2 establishes a wireless communication with each of the first operating device 22 and the second operating device 24.

The transmission controller 26 includes a wireless receiver. In the illustrated embodiment, the first transmission controller TC1 includes a first wireless receiver WR1. The second transmission controller TC2 includes a second wireless receiver WR2. The first wireless receiver WR1 is configured to wirelessly receive signals from each of the first wireless transmitter WT1 and the second wireless transmitter WT2. The second wireless receiver WR2 is configured to wirelessly receive signals from each of the first wireless transmitter WT1 and the second wireless transmitter WT2.

In the illustrated embodiment, the first wireless receiver WR1 is configured to wirelessly receive the first control signal SG1 transmitted from the first wireless transmitter WT1 and the second control signal SG2 transmitter from the second wireless transmitter WT2 via different channels, respectively. The second wireless receiver WR2 is configured to wirelessly receive the first control signal SG1 transmitted from the first wireless transmitter WT1 and the second control signal SG2 transmitter from the second wireless transmitter WT2 via different channels, respectively.

Furthermore, the first control unit CU1 is configured to interpret, as separate signals, the first control signal SG1 and the second control signal SG2 which are respectively received by the first wireless receiver WR1 via the different channels. The second control unit CU2 is configured to interpret, as separate signals, the first control signal SG1 and the second control signal SG2 which are respectively received by the second wireless receiver WR2 via the different channels.

In the illustrated embodiment, the bicycle operating apparatus 14 comprises the wireless transmitters WT1 and WT2 in the illustrated embodiment, and the transmission controller 26 includes the wireless receivers WR1 and WR2. However, the bicycle operating apparatus 14 can comprise a wireless receiver in addition to the wireless transmitters WT1 and WT2 if needed and/or desired. Furthermore, the transmission controller 26 can include a wireless transmitter in addition to the wireless receivers WR1 and WR2 if needed and/or desired. In such an embodiment, it is possible to establish a two-way communication between the bicycle operating apparatus 14 and the transmission controller 26.

The transmission controller 26 includes a pairing mode switch with which the transmission controller 26 enters the pairing mode. In the illustrated embodiment, the first transmission controller TC1 includes a first pairing mode switch SW31 configured to be operated by the user for entering the pairing mode. The second transmission controller TC2 includes a second pairing mode switch SW32 configured to be operated by the user for entering the pairing mode. The first transmission controller TC1 enters the pairing mode when the first pairing mode switch SW31 is operated by the user. The second transmission controller TC2 enters the pairing mode when the second pairing mode switch SW32 is operated by the user.

In the pairing mode of the first transmission controller TC1, the first control unit CU1 controls the first wireless receiver WR1 to scan wireless signals on specific channels. The communication controller CC1 controls the wireless transmitter WT1 to repeatedly transmit a wireless signal indicating a device identification (ID) of the first operating device 22 when the additional operating member 32 is operated and held by the user. Possible examples of the device ID include a mode number of the first operating device 22. The device ID of the first operating device 22 is stored in the memory M11 of the communication controller CC1 in advance.

The first wireless receiver WR1 receives the wireless signal indicating the device ID of the first operating device 22, The first control unit CU1 is configured to store reference ID information and reference signal patterns corresponding to the reference ID information in the memory M21 in advance. The first control unit CU1 is configured to compare the device ID of the first operating device 22 with the reference ID information. The first control unit CU1 is configured to determine, among the reference signal patterns, a target signal pattern corresponding to the device ID received by the wireless receiver WR1. The first control unit CU1 is configured to temporarily store the device ID of the first operating device 22 and the determined target signal pattern in the memory M21.

The first control unit CU1 is configured to interpret, using the target signal pattern, the first wireless signals transmitted from the wireless transmitter WT1 as separate signals from wireless signals transmitted from other devices. Thus, the first transmission controller TC1 establishes the wireless communication with the first operating device 22.

Furthermore, in the pairing mode of the first transmission controller TC1, the communication controller CC2 controls the wireless transmitter WT2 to repeatedly transmit a wireless signal indicating a device identification (ID) of the second operating device 24 when the additional operating member 34 is operated and held by the user. Possible examples of the device ID include a mode number of the second operating device 24. The device ID of the second operating device 24 is stored in the memory M12 of the communication controller CC2 in advance.

The first wireless receiver WR1 receives the wireless signal indicating the device ID of the second operating device 24. The first control unit CU1 is configured to compare the device ID of the second operating device 24 with the reference ID information. The first control unit CU1 is configured to determine, among the reference signal patterns, a target signal pattern corresponding to the device ID received by the wireless receiver WR1. The first control unit CU1 is configured to temporarily store the device ID of the second operating device 24 and the determined target signal pattern in the memory M21.

The first control unit CU1 is configured to interpret, using the target signal pattern, the first wireless signals transmitted from the wireless transmitter WT2 as separate signals from wireless signals transmitted from other devices. Thus, the first transmission controller TC1 establishes the wireless communication with the second operating device 24 as well as the first operating device 22.

In the illustrated embodiment, the pairing mode is finished in the first transmission controller TC1 when the first pairing mode switch SW31 is operated in the pairing mode. Since the above pairing mode is applied to the second transmission controller TC2, it will not be described in detail here for the sake of brevity.

As seen in FIG. 2, the transmission controller 26 includes at least one informing device configured to inform the user of a state of the transmission controller 26. In the illustrated embodiment, the first transmission controller TC1 includes a first informing device INF21. The second transmission controller TC2 includes a second informing device INF22.

The first informing device INF21 is configured to inform the user of a state of the first transmission controller TC1. The first informing device INF21 is configured to inform the user of a pairing mode between the bicycle operating apparatus 14 and the first transmission controller TC1. In the illustrated embodiment, the first informing device INF21 includes a light emitting diode (LED) configured to emit light in accordance with the state of the first transmission controller TC1 and the pairing mode.

Similarly, the second informing device INF22 is configured to inform the user of a state of the second transmission controller TC2. The second informing device INF22 is configured to inform the user of a pairing mode between the bicycle operating apparatus 14 and the second transmission controller TC2. In the illustrated embodiment, the second informing device INF22 includes the LED configured to emit light in accordance with the state of the second transmission controller TC2 and the pairing mode.

The first transmission TM1 includes a chain guide 64, a guide actuator 66, a position sensor 68, and a driver unit 70. The chain guide 64 is configured to shift the bicycle chain C between the sprockets BC21 of the rear sprocket assembly BC2. The guide actuator 66 is configured to move the chain guide 64 to shift the bicycle chain C. Possible examples of the guide actuator 66 include a direct current motor and a stepper motor.

The position sensor 68 is configured to sense a current position of the guide actuator 66 for determining a current gear position of the first transmission TM1. Possible examples of the position sensor 68 include a potentiometer, a rotary encoder, and a hall sensor. The driver unit 70 is configured to control the guide actuator 66 based on the current position of the guide actuator 66 and driving signals from the first transmission controller TC1. The first transmission controller TC1 is configured to generate the driving signals based on the first control signals SG1 from the first operating device 22.

The second transmission TM2 includes a chain guide 72, a guide actuator 74, a position sensor 76, and a driver unit 78. The chain guide 72 is configured to shift the bicycle chain C between the two chain wheels BC11 of the crank assembly BC1. The guide actuator 74 is configured to move the chain guide 72 to shift the bicycle chain C. Possible examples of the guide actuator 74 include a direct current motor and a stepper motor.

The position sensor 76 is configured to sense a current position of the guide actuator 74 for determining a current gear position of the second transmission TM2. Possible examples of the position sensor 76 include a potentiometer, a rotary encoder, and a hall sensor. The driver unit 78 is configured to control the guide actuator 74 based on the current position of the guide actuator 74 and driving signals from the second transmission controller TC2. The second transmission controller TC2 is configured to generate the driving signals based on the second control signals SG2 from the second operating device 24.

The transmission controller 26 includes a power supply device. In the illustrated embodiment, the first transmission controller TC1 includes a first power supply device BT21. The second transmission controller TC2 includes a second power supply device BT22. The first power supply device BT21 is configured to supply electrical power to the first control unit CU1, the first wireless receiver WR1, the first pairing mode switch SW31, and the first informing device INF21. In the illustrated embodiment, the first power supply device BT21 is also configured to supply electrical power to the guide actuator 66, the position sensor 68, and the driver unit 70. The second power supply device BT22 is configured to supply electrical power to the second control unit CU2, the second wireless receiver WR2, the second pairing mode switch SW32, and the second informing device INF22. In the illustrated embodiment, the second power supply device BT22 is also configured to supply electrical power to the guide actuator 74, the position sensor 76, and the driver unit 78.

Figure 5:
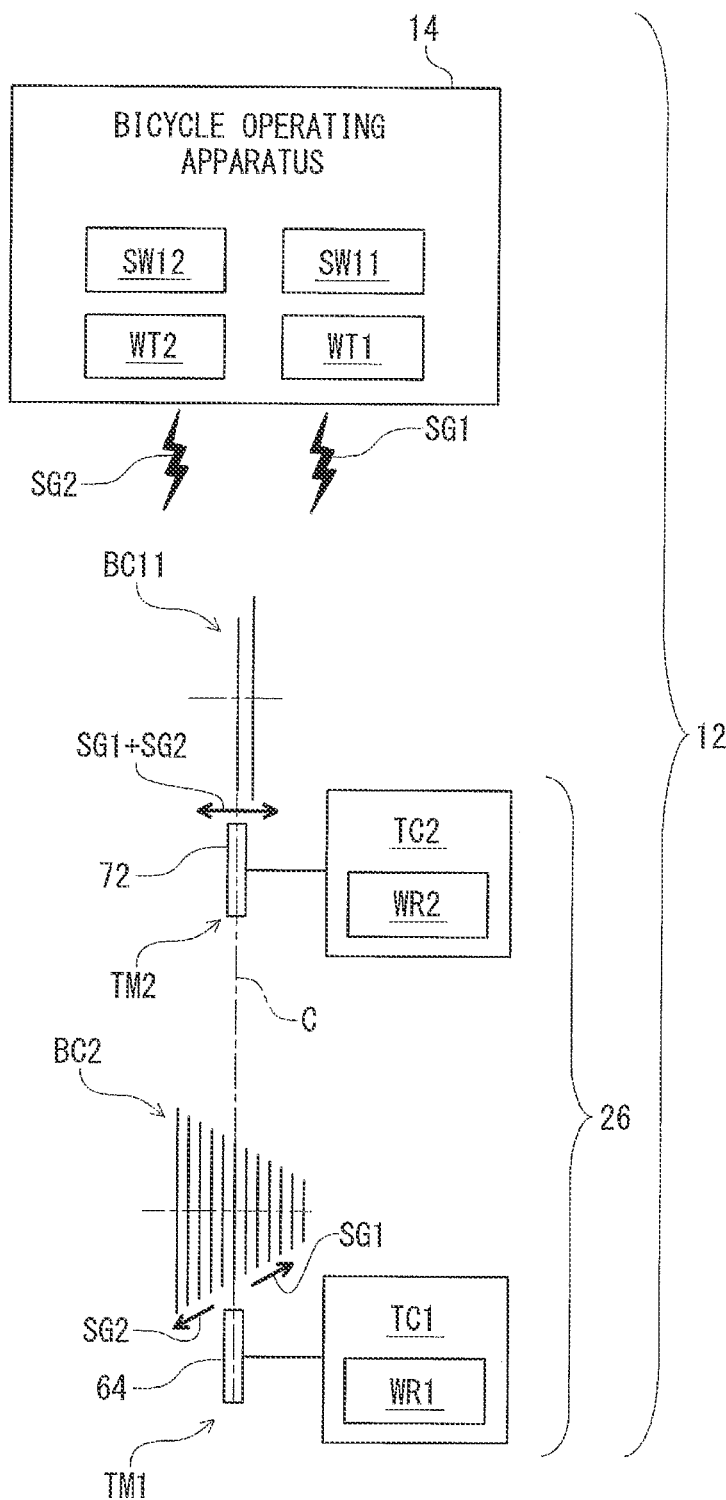
FIG. 5 shows shifting operations of the bicycle operating system illustrated in FIG. 2.

As seen in FIGS. 2 and 5, when the additional operating member 32 is operated by the user to activate the electrical switch SW11, the first control signal SG1 is transmitted from the wireless transmitter WT1 to each of the first wireless receiver WR1 and the second wireless receiver WR2. The first transmission controller TC1 controls the first transmission TM1 to upshift based on the first control signal SG1. Meanwhile, the second transmission controller TC2 controls the second transmission TM2 to keep a current gear position since the second wireless receiver WR2 does not receive both the first control signal SG1 and the second control signal SG2 from the wireless transmitters WT1 and WT2.

When the additional operating member 34 is operated by the user to activate the electrical switch SW12, the second control signal SG2 is transmitted from the wireless transmitter WT2 to the first wireless receiver WR1 and the second wireless receiver WR2. The first transmission controller TC1 controls the first transmission TM1 to downshift based on the second control signal SG2. Meanwhile, the second transmission controller TC2 controls the second transmission TM2 to keep the current gear position since the second wireless receiver WR2 does not receive both the first control signal SG1 and the second control signal SG2 from the wireless transmitters WT1 and WT2.

When the additional operating members 32 and 34 are substantially simultaneously operated by the user to respectively activate the electrical switches SW11 and SW12, the first and second control signals SG1 and SG2 are transmitted from the wireless transmitters WT1 and WT2 to each of the first wireless receiver WR1 and the second wireless receiver WR2. The second transmission controller TC2 controls the second transmission TM2 to upshift or downshift based on combination of the first control signal SG1 and the second control signal SG2. More specifically, the second transmission controller TC2 controls the second transmission TM2 to upshift based on combination of the first control signal SG1 and the second control signal SG2 when the current gear position of the second transmission TM2 is low gear corresponding to the smaller chain wheel BC11. The second transmission controller TC2 controls the second transmission TM2 to downshift based on combination of the first control signal SG1 and the second control signal SG2 when the current gear position of the second transmission TM2 is top gear corresponding to the larger chain wheel BC11.

Meanwhile, the first transmission controller TC1 controls the first transmission TM1 to keep the current gear position since the first wireless receiver WR1 substantially simultaneously receives both the first and second control signals SG1 and SG2 from the wireless transmitters WT1 and WT2.

With the bicycle operating system 12, the transmission controller 26 is configured to control the first transmission TM1 and the second transmission TM2 based on the first control signal SG1 generated by the first electrical switch SW11 and the second control signal SG2 generated by the second electrical switch SW12. Furthermore, the bicycle operating apparatus 14 includes the hydraulic operating unit 16 configured to operate the bicycle component (e.g., the first brake device BD1 and/or the second brake device BD2). Accordingly, it is possible to control the first transmission TM1, the second transmission TM2 and the other bicycle component using the bicycle operating apparatus 14 having a simple construction.

With the bicycle operating apparatus 14, the hydraulic unit HU1 is configured to operate the bicycle component in response to the operation of the operating member 18. The wireless transmitter WT1 is configured to wirelessly transmit the signal to the additional bicycle component in response to the input operation. Accordingly, it is possible to control the bicycle component and the additional bicycle component with a simple construction.

Second Embodiment

A bicycle operating system 212 in accordance with a second embodiment will be described below referring to FIGS. 6 and 7. The bicycle operating system 212 has the same configuration as the bicycle operating system 12 except for the bicycle operating apparatus 14. Thus, elements having substantially the same function as those in the first embodiment will be numbered the same here, and will not be described and/or illustrated again in detail here for the sake of brevity.

Figure 6:
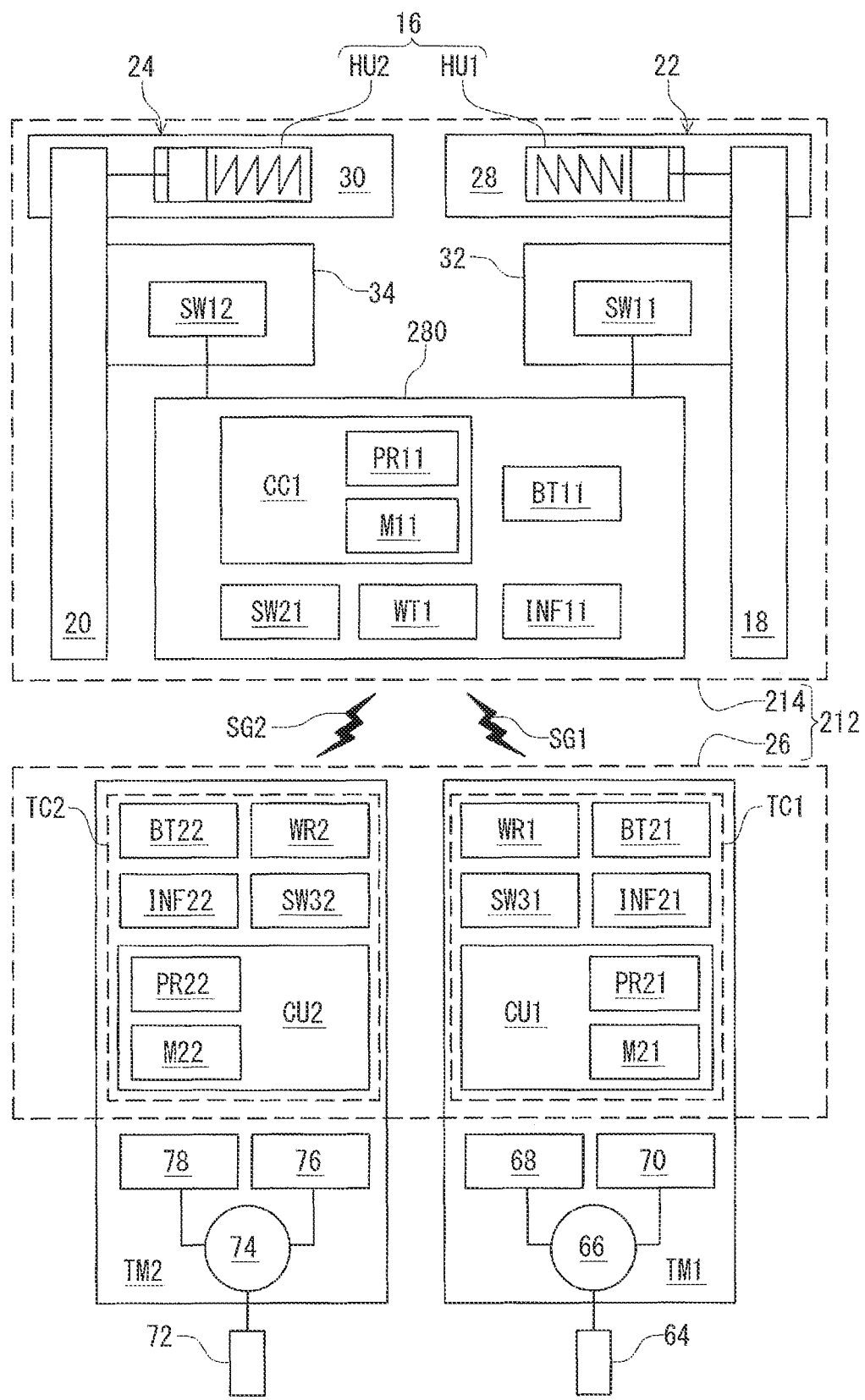
FIG. 6 is a block diagram of a bicycle operating system in accordance with a second embodiment.

As seen in FIG. 6, the bicycle operating system 212 comprises a bicycle operating apparatus 214. The bicycle operating apparatus 214 has substantially the same configuration as that of the bicycle operating apparatus 14 in accordance with the first embodiment. The bicycle operating apparatus 214 further comprises a housing 280 in which at least one of the wireless transmitter and the power supply device is provided. The housing 280 is separately mounted from the base member 28 to the bicycle body B. The housing 280 is separately mounted from the base member 30 to the bicycle body B.

Figure 7:
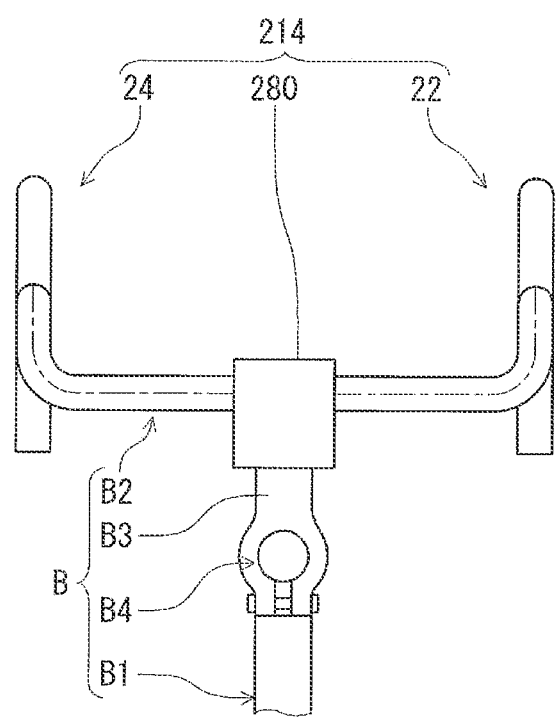
FIG. 7 is a partial top view of a bicycle operating apparatus of the bicycle operating system illustrated in FIG. 6.

In the illustrated embodiment, as seen in FIG. 7, the housing 280 is mounted on the stem B3 of the bicycle body B separately from the base members 28 and 30. However, the housing 280 can be mounted to other part of the bicycle body B if needed and/or desired.

As seen in FIG. 6, the wireless transmitter WT1 and the power supply device BT11 are provided in the housing 280. The communication controller CC1, the informing device INF11, and the function switch SW21 are provided in the housing 280. The wireless transmitter WT1, the power supply device BT11, the communication controller CC1, the informing device INF11, and the function switch SW21 are shared with the first operating device 22 and the second operating device 24. The wireless transmitter WT2, the power supply device BT12, the communication controller CC2, the informing device INF12, and the function switch SW22 are omitted from the bicycle operating apparatus 14.

The wireless transmitter WT1 is electrically connected to each of the first electrical switch SW11 and the second electrical switch SW12. In the illustrated embodiment, each of the first electrical switch SW11 and the second electrical switch SW12 is electrically connected to the wireless transmitter WT1 via the communication controller CC1. The wireless transmitter WT1 is configured to wirelessly transmit the first control signal SG1 to each of the first wireless receiver WR1 and the second wireless receiver WR2 in response to the input operation. The wireless transmitter WT1 is configured to wirelessly transmit the second control signal SG2 to each of the first wireless receiver WR1 and the second wireless receiver WR2 in response to the input operation.

With the bicycle operating apparatus 214, it is possible to obtain the same advantageous effect as that of the bicycle operating apparatus 14 in accordance with the first embodiment. Furthermore, since the housing 280 is separately mounted from the base member 28 to the bicycle body B, it is possible to simplify the configuration of the first operating device 22. Since the housing 280 is separately mounted from the base member 30 to the bicycle body B, it is possible to simplify the configuration of the second operating device 24. In the illustrated embodiment, it is possible to simplify the configurations of the first and second operating devices 22 and 24.

Third Embodiment

A bicycle operating system 312 in accordance with a third embodiment will be described below referring to FIGS. 8 and 9. The bicycle operating system 312 has the same configuration as the bicycle operating system 12 except for the additional operating members 32 and 34. Thus, elements having substantially the same function as those in the above embodiments will be numbered the same here, and will not be described and/or illustrated again in detail here for the sake of brevity.

Figure 8:
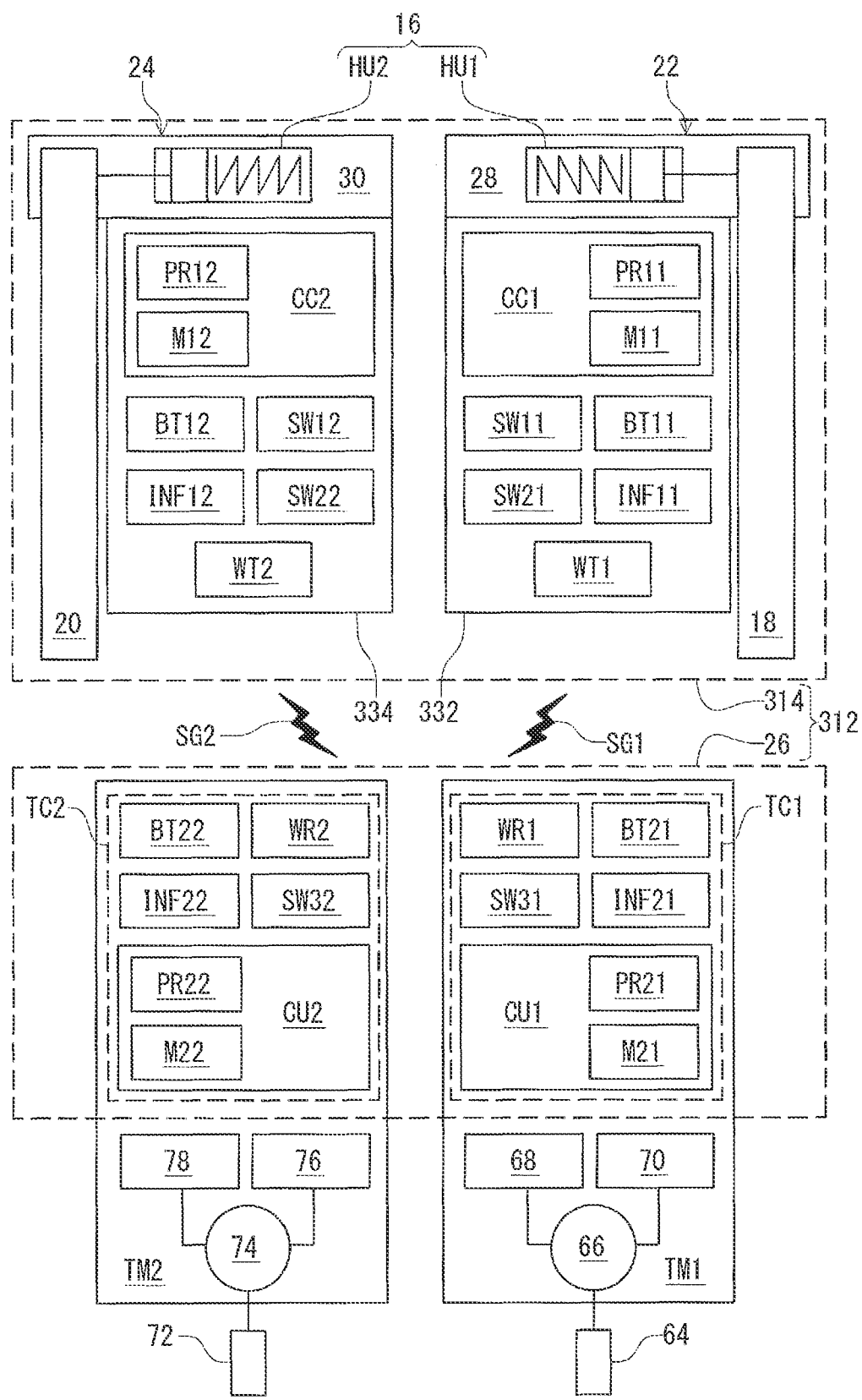
FIG. 8 is a block diagram of a bicycle operating system in accordance with a third embodiment.

As seen in FIG. 8, the bicycle operating system 312 comprises a bicycle operating apparatus 314. The bicycle operating apparatus 314 comprises an additional operating member 332 and an additional operating member 334. The additional operating member 332 is configured to receive the input operation. The additional operating member 334 is configured to receive the input operation.

Figure 9:
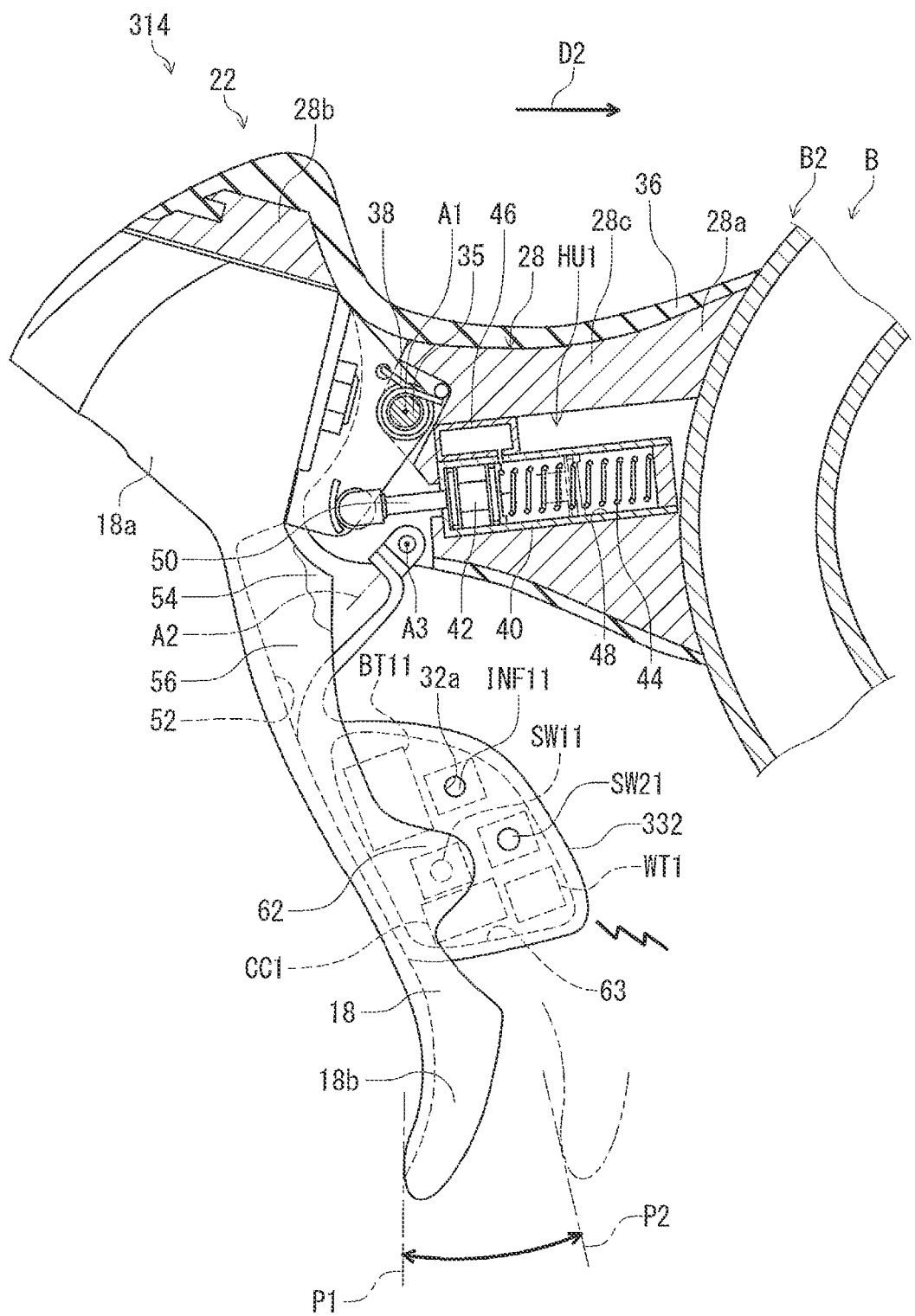
FIG. 9 is a cross-sectional view of an operating device of the bicycle operating system illustrated in FIG. 8.

As seen in FIG. 9, unlike the additional operating member 32 in accordance with the first embodiment, the additional operating member 332 is movably mounted to the base member 28. In the illustrated embodiment, the additional operating member 332 is pivotally mounted to the base member 28 about the second pivot axis A2. The electrical switch SW11 is mounted to one of the operating member 18 and the additional operating member 332. The electrical switch SW11 is configured to be activated by the other of the operating member 18 and the additional operating member 332 in response to movement of the additional operating member 332. In the illustrated embodiment, the electrical switch SW11 is mounted to the additional operating member 332. The electrical switch SW11 is configured to be activated by the operating member 18 in response to movement of the additional operating member 332. The electrical switch SW11 can be mounted to the operating member 18 if needed and/or desired. In such an embodiment, the electrical switch SW11 can be activated by the additional operating member 332 in response to movement of the additional operating member 332.

Furthermore, the additional operating member 332 is pivotable relative to the base member 28 about a third pivot axis A3. The additional operating member 332 is biased by a first biasing member (not shown) about the second pivot axis A2 as well as the first embodiment. The additional operating member 332 is further biased by a second biasing member (not shown) about the third pivot axis A3 toward the operating member 18. This allows the additional operating member 332 to follow pivot movement of the operating member 18 relative to the base member 28.

The above construction of the additional operating member 332 can be applied to the additional operating member 334 of the second operating device 24. Thus, the construction of the additional operating member 334 will not be described in detail here for the sake of brevity.

With the bicycle operating apparatus 314, it is possible to obtain the same advantageous effect as that of the bicycle operating apparatus 14 in accordance with the first embodiment.

Fourth Embodiment

A bicycle operating system 412 in accordance with a fourth embodiment will be described below referring to FIGS. 10 and 11. The bicycle operating system 412 has the same configuration as the bicycle operating system 12 except for the arrangement of the electrical switches SW11 and SW12. Thus, elements having substantially the same function as those in the above embodiments will be numbered the same here, and will not be described and/or illustrated again in detail here for the sake of brevity.

Figure 10:
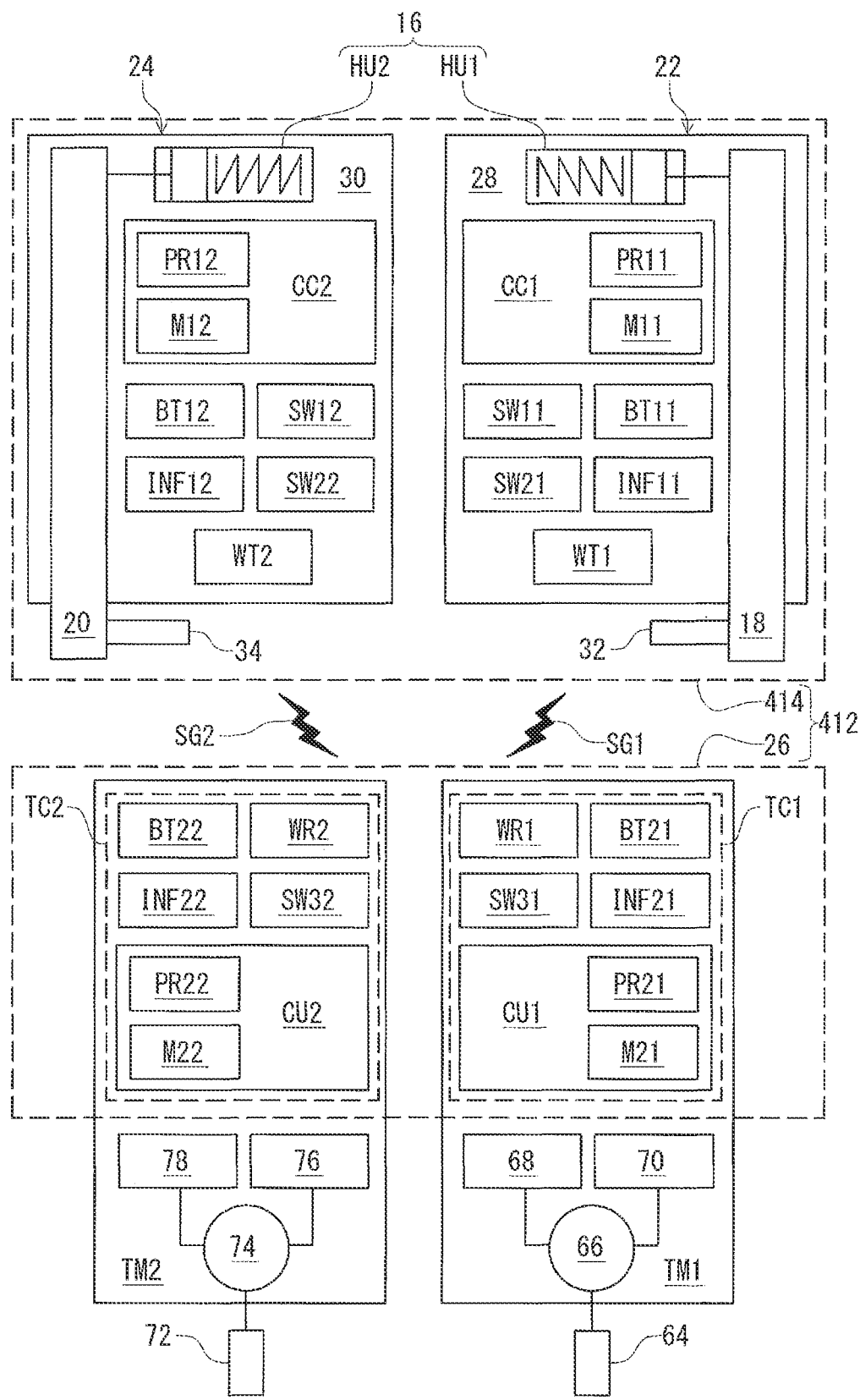
FIG. 10 is a block diagram of a bicycle operating system in accordance with a fourth embodiment.

As seen in FIG. 10, the bicycle operating system 412 comprises a bicycle operating apparatus 414. Unlike the electrical switch SW11 in accordance with the first embodiment, the electrical switch SW11 of the bicycle operating apparatus 414 is mounted to the base member 28. The electrical switch SW11 is configured to be activated by the additional operating member 32 in response to movement of the additional operating member 32. In the illustrated embodiment, the wireless transmitter WT1, the power supply device BT11, the communication controller CC1, the informing device INF11, and the function switch SW21 are also mounted to the base member 28.

Similarly, the electrical switch SW12 of the bicycle operating apparatus 414 is mounted to the base member 30. The electrical switch SW12 is configured to be activated by the additional operating member 34 in response to movement of the additional operating member 34. In the illustrated embodiment, the wireless transmitter WT2, the power supply device BT12, the communication controller CC2, the informing device INF12, and the function switch SW22 are also mounted to the base member 30.

Figure 11:
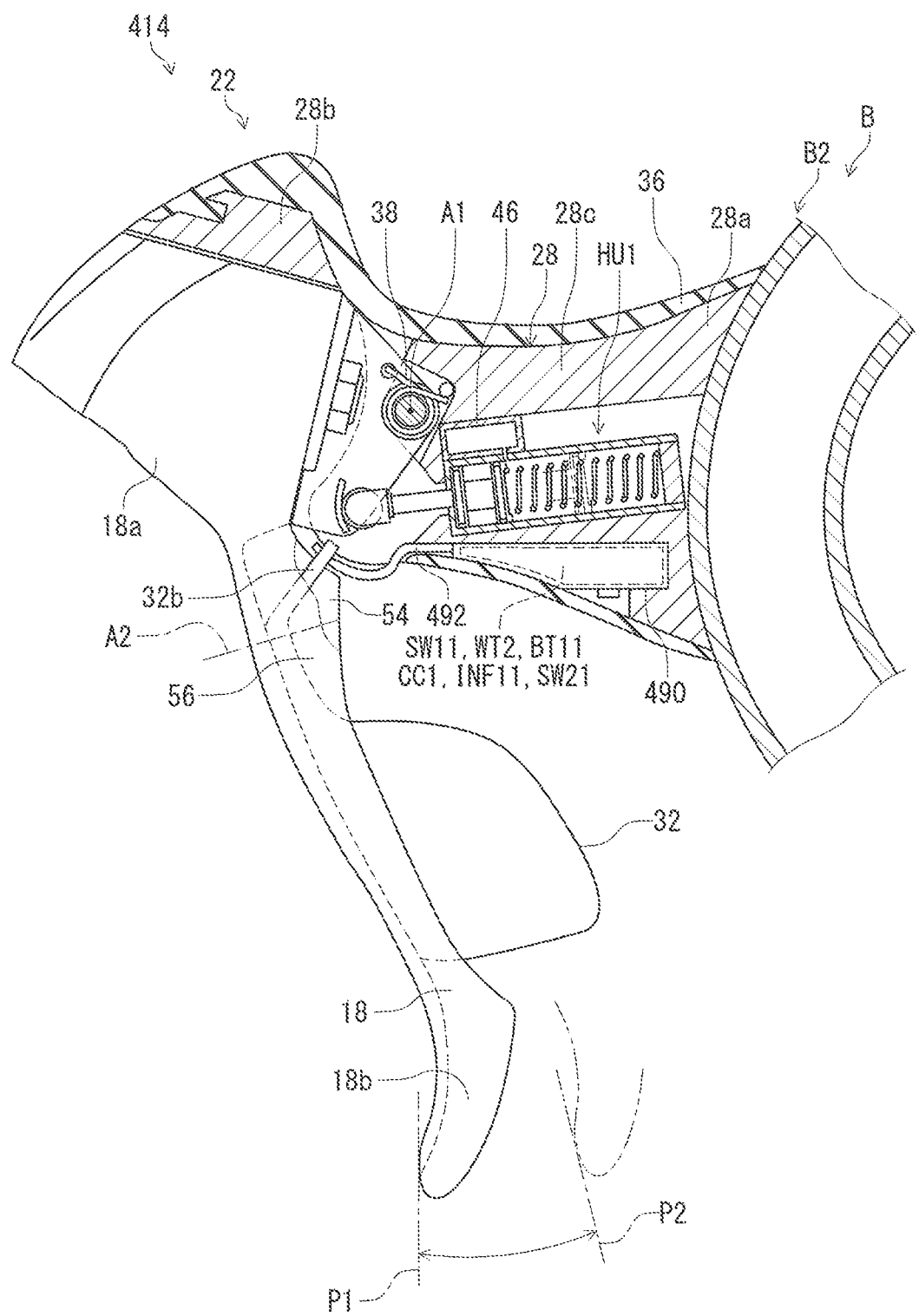
FIG. 11 is a cross-sectional view of an operating device of the bicycle operating system illustrated in FIG. 10.

As seen in FIG. 11, the electrical switch SW11 is provided in the base member 28. The wireless transmitter WT1, the power supply device BT11, the communication controller CC1, the informing device INF11, and the function switch SW21 are also provided in the base member 28. The first operating device 22 includes an inner housing 490 secured to the base member 28. The electrical switch SW11, the wireless transmitter WT1, the power supply device BT11, the communication controller CC1, the informing device INF11, and the function switch SW21 are provided in the inner housing 490.

The electrical switch SW11 includes an operating lever 492 configured to transmit an operation of the additional operating member 32 to the electrical switch SW11. The additional operating member 32 includes an operating portion 32b. The operating portion 32b engages with the operating lever 492 to transmit an operation of the additional operating member 32.

The above construction of the first operating device 22 can be applied to the second operating device 24. Thus, the construction of the second operating device 24 will not be described in detail here for the sake of brevity.

With the bicycle operating apparatus 414, it is possible to obtain the same advantageous effect as that of the bicycle operating apparatus 14 in accordance with the first embodiment. Furthermore, since the electrical switch SW11 is mounted to the base member 28, it is possible to reduce weight of the operating member 18 and/or the additional operating member 32, improving ease of use of the bicycle operating apparatus 414. Similarly, since the electrical switch SW12 is mounted to the base member 30, it is possible to reduce weight of the operating member 20 and/or the additional operating member 34, improving ease of use of the bicycle operating apparatus 414.

Fifth Embodiment

A bicycle operating system 512 in accordance with a fifth embodiment will be described below referring to FIGS. 12 and 13. The bicycle operating system 512 has the same configuration as the bicycle operating system 12 except for the transmission controller 26. Thus, elements having substantially the same function as those in the above embodiments will be numbered the same here, and will not be described and/or illustrated again in detail here for the sake of brevity.

Figure 12:
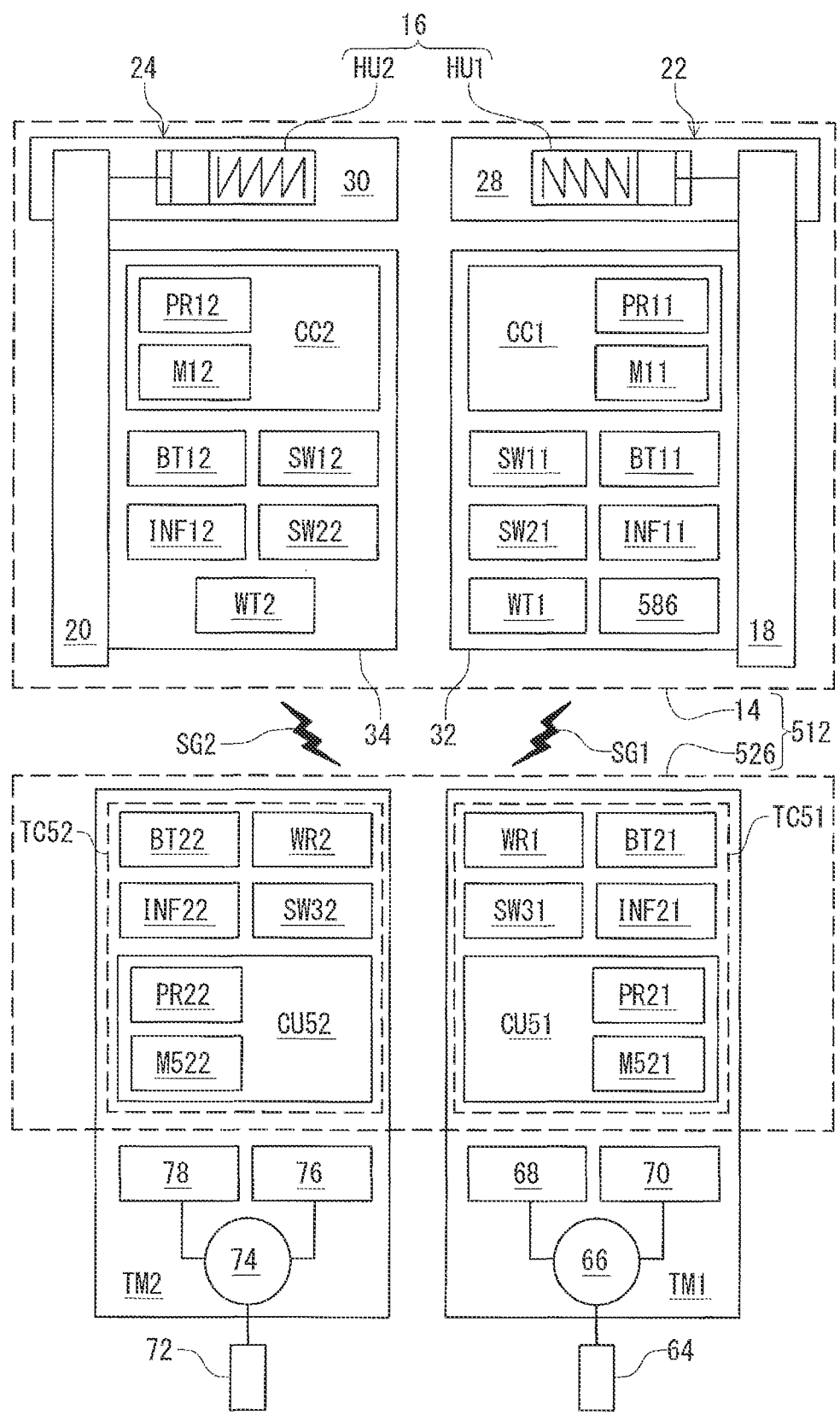
FIG. 12 is a block diagram of a bicycle operating system in accordance with a fifth embodiment.

As seen in FIG. 12, the bicycle operating system 512 comprises the bicycle operating apparatus 14 and a transmission controller 526. The transmission controller 526 is configured to control at least one transmission in accordance with a transmission route in response to at least one of the first control signal SG1 and the second control signal SG2. In the illustrated embodiment, the transmission controller 526 is configured to control the first transmission TM1 and the second transmission TM2 in accordance with the transmission route in response to at least one of the first control signal SG1 and the second control signal SG2.

The transmission controller 526 includes a first transmission controller TC51 and a second transmission controller TC52. The first transmission controller TC51 includes a first control unit CU51. The second transmission controller TC52 includes a second control unit CU52. The first control unit CU51 has substantially the same configuration as that of the first control unit CU1 in accordance with the first embodiment. The second control unit CU52 has substantially the same configuration as that of the second control unit CU2 in accordance with the first embodiment.

The first control unit CU51 includes the processor PR21 and a memory M521. The first control unit CU51 is configured to store the transmission route in the memory M521. The second control unit CU52 includes the processor PR22 and a memory M522. The second control unit CU52 is configured to store the transmission route in the memory M522.

FIG. 13 shows a shift table including gear ratios, a total number of teeth of each sprocket element in the chain wheel BC11 ("FS"), and a total number of teeth of each sprocket element in the rear sprocket BC2 ("RS"). The first control unit CU51 of the first transmission controller TC51 is configured to store the shift table for the bicycle operating system 512. In the illustrated embodiment, the first transmission TM1 has low and top gears as the gear position. The second transmission TM2 has first to eleventh gears as the gear position.

As seen in FIG. 13, the first control unit CU51 is configured to store a route R1 in the memory M521 (FIG. 12). The second control unit CU52 is configured to store the route R1 in the memory M522 (FIG. 12). The route R1 includes synchro-shift points which are each circled with a single circle. In the illustrated embodiment, the transmission controller 526 is configured to control both the first transmission TM1 and the second transmission TM2 to change gears at the gear position corresponding to the synchro-shift point in response to a single shift signal.

In the illustrated embodiment, the route R1 is used for both upshifting and downshifting. The transmission controller 526 can be configured to store an upshift route for upshifting and a downshift route, which is different from the upshift route, for downshifting if needed and/or desired.

As seen in FIG. 13, in the route R1, first to seventh gears of the first transmission TM1 are used for low gear of the second transmission TM2. Sixth to eleventh gears of the first transmission TM1 are used for top gear of the second transmission TM2. Namely, thirteen gear positions on the route R1.

The transmission controller 526 has a synchro mode and a normal mode. In the synchro mode, the transmission controller 526 is configured to control at least one of the first transmission TM1 and the second transmission TM2 in accordance with the transmission route in response to a single shift signal from the bicycle operating apparatus 14. In the normal mode, the transmission controller 526 is configured to control the first transmission TM1 and the second transmission TM2 as well as the first embodiment, for example.

As seen in FIG. 10, the bicycle operating system 512 further comprises a mode selector 586 configured to allow the user to select a shifting mode among the synchro mode and the normal mode. The mode selector 586 is provided in the first operating device 22, for example. The wireless transmitter WT1 wirelessly transmits a shifting mode selected via the mode selector 586 to the transmission controller 526. The transmission controller 526 is configured to set the shifting mode based on the shifting mode selected via the mode selector 586.

In the synchro mode, the additional operating member 32 is operated by the user for upshifting. The additional operating member 34 is operated by the user for downshifting.

In a case where the first transmission TM1 is in sixth gear and the second transmission TM2 is in low gear in the synchro mode, the first transmission controller TC51 controls the first transmission TM1 to upshift in response to the first control signal SG1. Meanwhile, the second transmission controller TC52 controls the second transmission TM2 to keep in low gear regardless of the first control signal SG1.

In a case where the first transmission TM1 is in sixth gear and the second transmission TM2 is in low gear in the synchro mode, the first transmission controller TC51 controls the first transmission TM1 to downshift in response to the second control signal SG2. Meanwhile, the second transmission controller TC52 controls the second transmission TM2 to keep in low gear regardless of the second control signal SG2.

In a case where the first transmission TM1 is in seventh gear and the second transmission TM2 is in low gear in the synchro mode, the first transmission controller TC51 controls the first transmission TM1 to downshift and the second transmission TM2 to upshift in response to the first control signal SG1.

In a case where the first transmission TM1 is in sixth gear and the second transmission TM2 is in top gear in the synchro mode, the first transmission controller TC51 controls the first transmission TM1 to upshift and the second transmission TM2 to downshift in response to the second control signal SG2.

With the bicycle operating system 512, the transmission controller 526 is configured to control at least one transmission in accordance with the transmission route in response to at least one of the first control signal SG1 and the second control signal SG2. Accordingly, it is possible to simplify the input operation. Furthermore, since the bicycle operating apparatus 514 includes the hydraulic operating unit 16, it is possible to improve ease of use relative to the bicycle operating system 512.

It will be apparent to those skilled in the bicycle field from the present disclosure that the above embodiments can be at least partially combined with each other.

In the present application, the term "comprising" and its derivatives, as used herein, are intended to be open ended terms that specify the presence of the stated features, elements, components, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle operating apparatus comprising:
a base member configured to be attached to a bicycle body;

an operating member movably mounted to the base member configured to be operated by a user;
an electrical switch configured to be activated by an input operation from the user;
a wireless transmitter configured to be electrically connected to the electrical switch and configured to wirelessly transmit a signal to a bicycle component in response to the input operation;
a power supply device configured to supply electrical power to at least one of the electrical switch and the wireless transmitter;
a hydraulic unit including a hydraulic cylinder and a reservoir in fluid communication with the hydraulic cylinder; and
an inner housing provided to the base member such that the hydraulic cylinder is outside of the inner housing,
the wireless transmitter and the power supply device are mounted to the base member, and
the power supply device being provided within the inner housing.

2. The bicycle operating apparatus according to claim 1, further comprising:
the power supply device being partially overlapped by at least one of the hydraulic cylinder and the reservoir when viewed in a direction perpendicular to a pivot axis of the operating member.

3. The bicycle operating apparatus according to claim 1, further comprising:
the hydraulic unit configured to be operatively coupled to the operating member and configured to operate another bicycle component in response to an operation of the operating member; and
an additional operating member configured to receive the input operation, wherein
the hydraulic unit is mounted to the base member,
the additional operating member is movable relative to the operating member,
the electrical switch is mounted to one of the base member, the operating member and the additional operating member, and
the additional operating member is movably mounted to the base member.

4. The bicycle operating apparatus according to claim 3, wherein
the electrical switch is mounted to the base member, and
the electrical switch is configured to be activated by the additional operating member in response to movement of the additional operating member.

5. The bicycle operating apparatus according to claim 1, further comprising:
the hydraulic unit configured to be operatively coupled to the operating member and configured to operate a bicycle component in response to an operation of the operating member, wherein
the hydraulic unit is mounted to the base member.

6. The bicycle operating apparatus according to claim 1, wherein
the hydraulic cylinder is disposed at a height below at least a portion of the reservoir in a mounting state where the base member is attached to the bicycle body.

7. The bicycle operating apparatus according to claim 1, wherein
an entirety of the hydraulic cylinder is disposed at a height below at least a portion of the reservoir in a mounting state where the base member is attached to the bicycle body.

8. The bicycle operating apparatus according to claim 1, wherein
when viewed in plan view, the hydraulic cylinder is overlapped by the reservoir in a mounting state where the base member is attached to the bicycle body.

9. A bicycle operating system comprising:
a bicycle operating apparatus including
a first electrical switch configured to receive a first input operation from a user to generate a first control signal in response to the first input operation,
a second electrical switch configured to receive a second input operation from the user to generate a second control signal in response to the second input operation, and
a hydraulic operating unit configured to operate a bicycle component, the hydraulic unit including a hydraulic cylinder and a reservoir in fluid communication with the hydraulic cylinder; and
a transmission controller configured to control a first transmission to upshift in response to the first control signal, the transmission controller being configured to control the first transmission to downshift in response to the second control signal, the transmission controller being configured to control a second transmission to upshift or downshift in response to combination of the first control signal and the second control signal.

10. The bicycle operating system according to claim 9, wherein
the hydraulic operating unit includes
a first hydraulic unit configured to operate a first bicycle component, and
a second hydraulic unit configured to operate a second bicycle component,
the bicycle operating apparatus includes
a first operating device including the first electrical switch and the first hydraulic unit, and
a second operating device including the second electrical switch and the second hydraulic unit, and
the second operating device is separately provided from the first operating device.

11. The bicycle operating system according to claim 9, wherein
the hydraulic cylinder is disposed at a height below at least a portion of the reservoir in a mounting state where the base member is attached to the bicycle body.

12. The bicycle operating system according to claim 9, wherein
an entirety of the hydraulic cylinder is disposed at a height below at least a portion of the reservoir in a mounting state where the base member is attached to the bicycle body.

13. A bicycle operating system comprising:
a bicycle operating apparatus including
a first electrical switch configured to receive a first input operation from a user to generate a first control signal in response to the first input operation,
a second electrical switch configured to receive a second input operation from the user to generate a second control signal in response to the second input operation, and
a hydraulic operating unit configured to operate a bicycle component, the hydraulic unit including a hydraulic cylinder and a reservoir in fluid communication with the hydraulic cylinder; and
a transmission controller configured to have a synchro mode and a normal mode, the transmission controller being configured to control at least one transmission in accordance with a transmission route in response to at least one of the first control signal and the second control signal in the synchro mode.

14. The bicycle operating system according to claim 13, wherein
the hydraulic cylinder is disposed at a height below at least a portion of the reservoir in a mounting state where the base member is attached to the bicycle body.

15. The bicycle operating system according to claim 13, wherein
an entirety of the hydraulic cylinder is disposed at a height below at least a portion of the reservoir in a mounting state where the base member is attached to the bicycle body.

16. A bicycle operating apparatus comprising:
a base member configured to be attached to a bicycle body, the base member having an upper portion and a lower portion, the upper portion being located above the lower portion in a state in which the bicycle operating apparatus is attached to a handlebar of the bicycle;

an operating member movably mounted to the base member configured to be operated by a user;

an electrical switch configured to be activated by an input operation from the user;

a wireless transmitter configured to be electrically connected to the electrical switch and configured to wirelessly transmit a signal to a bicycle component in response to the input operation;

a power supply device configured to supply electrical power to at least one of the electrical switch and the wireless transmitter; and an inner housing provided to the lower portion of the base member, the lower portion is closer to the wireless transmitter and the power supply device than the upper portion, and the wireless transmitter and the power supply device being provided within the inner housing.

* * * * *